(12) United States Patent
Meyer

(10) Patent No.: US 7,248,442 B1
(45) Date of Patent: Jul. 24, 2007

(54) INTEGRATED RECORDING HEAD MICROPOSITIONER USING OFF-AXIS FLEXURE BENDING

(76) Inventor: Dallas W. Meyer, 4130 Sugar Maple Dr., Danville, CA (US) 94506

( * ) Notice: Subject to any disclaimer, the term of this patent is extended or adjusted under 35 U.S.C. 154(b) by 314 days.

(21) Appl. No.: 10/794,482

(22) Filed: Mar. 5, 2004

Related U.S. Application Data

(60) Provisional application No. 60/452,570, filed on Mar. 5, 2003.

(51) Int. Cl.
*G11B 5/596* (2006.01)
(52) U.S. Cl. .................. 360/294.3; 360/294.7
(58) Field of Classification Search ............. 360/234.7, 360/234.8, 294.3
See application file for complete search history.

(56) References Cited

U.S. PATENT DOCUMENTS

| | | | |
|---|---|---|---|
| 5,060,210 A | 10/1991 | Fennema et al. | 369/32 |
| 5,521,778 A | 5/1996 | Boutaghou et al. | 360/106 |
| 6,078,468 A | 6/2000 | Fiske | 360/104 |
| 6,101,058 A | 8/2000 | Morris | 360/69 |
| 6,262,868 B1 | 7/2001 | Arya et al. | 360/290 |
| 6,414,827 B1 | 7/2002 | Young et al. | 360/678.09 |
| 6,421,211 B1 | 7/2002 | Hawwa et al. | 360/294.4 |
| 6,452,755 B2 | 9/2002 | Bonin | 360/294.6 |
| 6,469,859 B1 | 10/2002 | Chainer et al. | 360/75 |
| 6,490,118 B1 | 12/2002 | Ell et al. | 360/77.04 |
| 6,493,177 B1 | 12/2002 | Ell et al. | 360/78.05 |
| 6,501,623 B1 | 12/2002 | Sassolini et al. | 360/245.3 |
| 6,535,360 B1 | 3/2003 | Kim et al. | 360/294.3 |
| 6,542,281 B2 | 4/2003 | Feldman et al. | 359/280 |
| 6,545,970 B2 | 4/2003 | Durnin et al. | 369/112.24 |
| 6,547,975 B1 | 4/2003 | Kobrin | 216/22 |

(Continued)

OTHER PUBLICATIONS

Co-pending U.S. Patent Application to Dallas W. Meyer, U.S. Appl. No. 10/342,920, filed Jan. 13, 2003 (54 pages), and 17 sheets of accompanying drawings. Note: In an Office Action mailed in this case on Jun. 14, 2004, claims 1, 4, 12, 13, 24, and 31 were rejected under 35 U.S.C. § 102(e) by U.S. Patent No. 6,600,634 to Kim, et al., claims 1-3, 7, 10, 12, 13, 16, 17, 24, 25, 29, 31-33, and 35-38 were rejected under 35 U.S.C. § 102(e) by U.S. Patent No. 6,611,399 to Mei, et al, and claims 14, 15 were rejected under 35 U.S.C. § 103(a) by Mei.

(Continued)

*Primary Examiner*—Jefferson Evans
(74) *Attorney, Agent, or Firm*—Workman Nydegger

(57) ABSTRACT

A recording head for use in magnetic storage devices is disclosed. The recording head includes a transducer that is bi-directionally movable with respect to a magnetic medium surface of the magnetic storage medium, thereby enabling improved positioning of the transducer during read and write operations of the transducer. The recording head further includes a slider body and an interleaver assembly that is interposed between the transducer and the slider body. The interleaver assembly includes a flexure assembly having a plurality of resilient flexure beams. A motor assembly incorporated into the recording head can be selectively actuated to cause movement of the flexure assembly and corresponding movement of a portion of the interleaver assembly and the transducer body. The flexure assembly is configured to constrain motion of the transducer in vertical and horizontal directions with respect to the magnetic medium surface to allow for enhanced transducer positioning.

31 Claims, 24 Drawing Sheets

U.S. PATENT DOCUMENTS

| | | | |
|---|---|---|---|
| 6,556,380 B2 | 4/2003 | Bunch et al. | 360/235.1 |
| 6,563,665 B1 | 5/2003 | Ell | 360/78.05 |
| 6,594,119 B1 | 7/2003 | Koshikawa et al. | 360/294.3 |
| 6,600,619 B1 | 7/2003 | Morris et al. | 360/75 |
| 6,600,634 B1 | 7/2003 | Kim et al. | 360/294.5 |
| 6,611,399 B1 | 8/2003 | Mei et al. | 360/234.7 |
| 6,633,451 B1 | 10/2003 | Chainer et al. | 360/75 |
| 6,683,757 B1* | 1/2004 | Bonin et al. | 360/294.3 |
| 6,697,232 B1* | 2/2004 | Hipwell et al. | 360/294.5 |
| 6,747,836 B2 | 6/2004 | Stevens et al. | 360/78.05 |
| 6,768,610 B1* | 7/2004 | Morris et al. | 360/78.07 |
| 6,785,086 B1* | 8/2004 | Bonin et al. | 360/78.05 |
| 6,859,346 B1* | 2/2005 | Meyer | 360/294.5 |
| 6,870,709 B2* | 3/2005 | Shimanouchi et al. | 360/294.4 |
| 7,092,194 B2* | 8/2006 | Meyer | 360/75 |
| 7,095,591 B2* | 8/2006 | Imamura et al. | 360/234.7 |
| 2003/0093894 A1 | 5/2003 | Dugas et al. | 29/603.15 |
| 2003/0161061 A1 | 8/2003 | Lamberts | 360/31 |
| 2003/0161070 A1* | 8/2003 | Bonin | 360/234.7 |
| 2003/0161071 A1* | 8/2003 | Bonin et al. | 360/234.7 |
| 2003/0197969 A1 | 10/2003 | Szita et al. | 360/77.08 |

OTHER PUBLICATIONS

Co-pending U.S. Patent Application to Dallas W. Meyer, U.S. Appl. No. 10/342,615, filed Jan. 13, 2003 (43 pages), and 7 sheets of accompanying drawings. Note: In an Office Action mailed in this case on Aug. 25, 2004, claims 1-34 were rejected under 35 U.S.C. § 102(e) by U.S. Patent No. 6,768,610 to Morris, et al., and claims 35-42 were rejected under 35 U.S.C. § 103(a) by Morris, et al. in view of U.S. Patent No. 6,078,468 to Fiske.

Co-pending U.S. Patent Application to Dallas W. Meyer, U.S. Appl. No. 10/775,406, filed Feb. 9, 2004.

Co-pending U.S. Patent Application to Dallas W. Meyer, U.S. Appl. No. 10/728,561, filed Dec. 5, 2003.

Co-pending U.S. Patent Application to Dallas W. Meyer, U.S. Appl. No. 10/818,641, filed Apr. 5, 2004.

Co-pending U.S. Patent Application to Dallas W. Meyer, U.S. Appl. No. 10/900,713, filed Jul. 27, 2004.

* cited by examiner

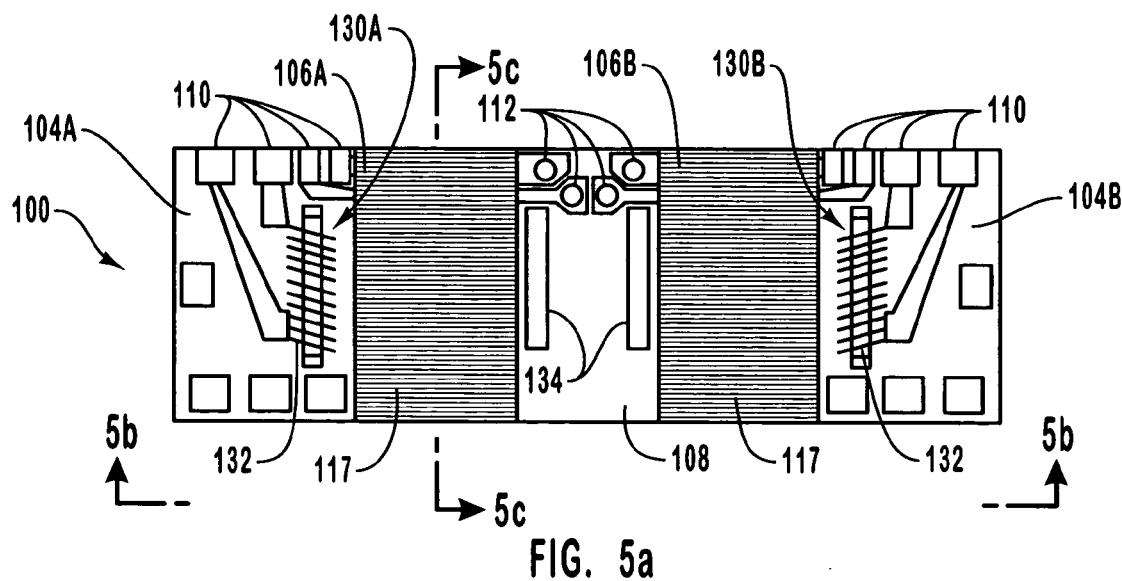
FIG. 5a
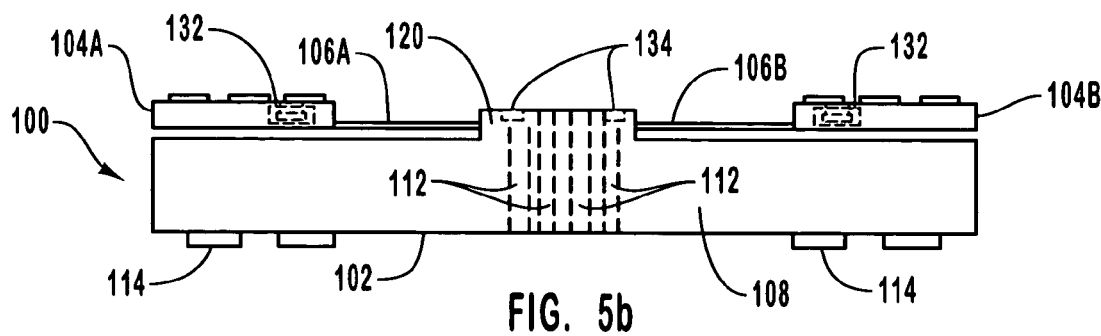
FIG. 5b
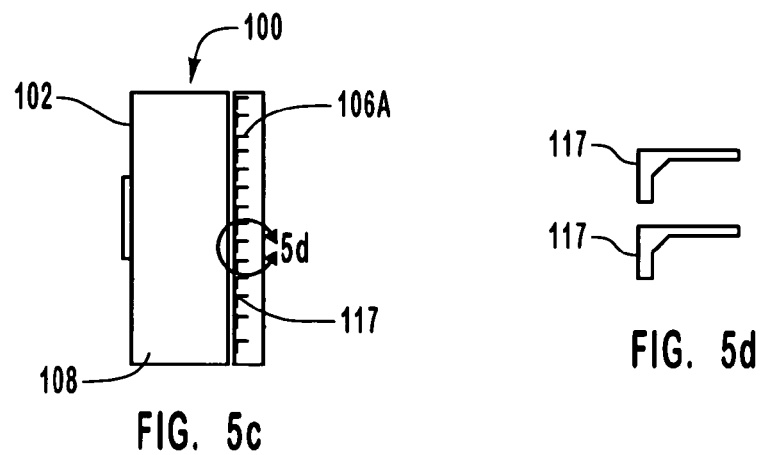
FIG. 5c
FIG. 5d

INTEGRATED RECORDING HEAD MICROPOSITIONER USING OFF-AXIS FLEXURE BENDING

RELATED APPLICATIONS

This application claims the benefit of U.S. Provisional Patent Application Ser. No. 60/452,570, filed Mar. 5, 2003, entitled "Integrated Recording Head Micropositioner Using Off-axis Flexure Bending," which is incorporated herein by reference.

BACKGROUND OF THE INVENTION

1. The Field of the Invention

The present invention generally relates to data storage on rotating magnetic storage devices. More specifically, the present invention relates to a rotating magnetic storage device having a recording head that is bi-directionally controlled using off-axis flexure bending.

2. The Related Technology

During recent years, there has been a steady improvement in the volume of data that can be stored on magnetic storage media, such as hard disk drives used in computers. Today, a single 3.5 inch magnetic storage disk can store twenty gigabytes or more of data. At the same time, storage capacity per unit cost has fallen dramatically, which has enabled individual users and enterprises to radically change the way in which data is recorded and stored. Indeed, the ability to store large volumes of data inexpensively has been a driving factor in the information technology revolution during recent decades.

Conventional storage media include solid-state devices, drive arrays (RAID), single rotating magnetic disk drives, and removable optical media. FIG. 1 is a graph that illustrates tradeoffs between performance and cost associated with typical storage media used in combination with computers. As shown, removable optical storage devices, such as optical read-only or read-write disks, generally provide the least expensive alternative for storing large amounts of data. However, single rotating magnetic devices, such as hard disk drives used in large numbers of personal computers, provide mass storage that is almost as cost effective as removable optical devices, but with better performance. In this context, the term "performance" relates primarily to the reliability and access times associated with the various storage media. As shown in FIG. 1, however, the performance of single rotating magnetic storage devices is increasing less rapidly than the performance of RAID and solid-state devices.

Although magnetic storage devices are widely used and have become significantly less expensive during recent years, a number of technological hurdles have been encountered, which threaten to reduce the rate at which future improvements in cost and performance will occur. FIG. 2 is a perspective view of a conventional magnetic storage device. Magnetic disk drive 10 includes a rotating magnetic storage medium 12 that, as mentioned above, can store tens of gigabytes of data in an area of only a few square inches. A head gimble assembly 14 ("HGA") positions a recording head 16 with a transducer in close proximity to the surface of the magnetic storage medium 12 to enable data to be read from and written to the storage medium. An actuator assembly 18 rotates the HGA 14 during operation to position the transducer of the recording head 16 at the proper location over the rotating magnetic storage medium 12.

One of the most significant problems that has arisen in the effort to improve capacity and performance in magnetic storage devices is track following, or the ability to quickly and reliably position the transducer of the recording head 16 over the appropriate track on the magnetic storage medium 12. In conventional devices, the actuator assembly 18 includes a voice coil that uses a feedback loop based on servo tracks that are embedded between the data tracks on the magnetic storage medium 12. The track pitch (i.e., the spacing between adjacent tracks) of the storage medium 12 in conventional devices is as low as 0.2 microns. At such small track pitches, non-repeatable motions of the rotating magnetic storage medium 12, the HGA 14, and the other mechanical components of disk drive 10 make it increasingly difficult to reliably follow the data tracks on the magnetic storage medium. For example, in devices having an HGA 14 with a length of 1.5 inches to the recording head 16 and a track pitch of 0.2 microns, the angular position of the head gimble assembly needs to have resolution better than 33 millionths of an arc second in order to adequately follow the tracks on the magnetic storage medium 12. Efforts to achieve adequate track following have included the use of smaller disks for high speed drives, fluid motors for improved damping, and active rotational feedback sensors using negative feedback algorithms. However, the use of such techniques can lead to either the loss of capacity or are only temporary solutions to this problem, as track pitches continue to decrease.

A closely related problem is that of the settling time and performance, which relates to the ability to stabilize the recording head over a track. The settling time is dictated by the inertial loads and the exciting resonant frequencies associated with the act of accessing a selected track, the amount of damping in the HGA 14, and the servo bandwidth. These factors are generally limited by the resonant frequencies in the arm of the HGA 14. Thus, settling times have not significantly improved in the last several generations of drives in view of the fundamental limitations on the mechanics of drives that use a recording head 16 controlled by an HGA 14 and an actuator assembly 18, as shown in FIG. 2.

As both the track pitch and the size of sector regions on the magnetic media used to physically record bits of data have decreased, transducers in disk drives have been required to be positioned closer to the surface of the magnetic storage device. A representation of the distance between the transducer and the surface of the magnetic storage medium, referred to as the fly height 22, is shown in FIG. 3. Current fly heights are now as small as 50 Angstroms (Å) in high capacity disk drives. The fly height is dictated by the fundamental resolution requirements associated with the magnetic storage device, which is a function of the track pitch and the size of the regions on which bits of data are physically recorded. If the fly height becomes too large during operation, the transducer becomes unable to resolve bits encoded in the storage medium. On the other hand, if the transducer is brought into physical contact with the optical storage medium, which can be traveling at speeds on the order of 100 miles per hour, both the transducer and the storage device can be damaged.

The fly height has been controlled in conventional devices by improving the manufacturing tolerances, by designing a highly rigid and dampened HGA 14, and by the use of air bearings associated with the recording heads 16. An air bearing is a cushion or layer of air that develops between the surface of the magnetic storage medium and the adjacent surface of the transducer as the storage medium moves underneath the transducer.

As noted above, as the fly heights required in magnetic storage devices have decreased, the problem of transducer damage from excessive media contact has become more pronounced. Current giant magnetoresistance ("GMR") and tunneling magnetoresistance ("TMR") transducer heads are sensitive to being damaged if excessive contact with the storage medium is experienced. One related problem is that conventional transducer designs often lead to thermal pole tip protrusion, which occurs when the transducer is heated and the tip, or pole, of the transducer extends and protrudes beyond the plane of the transducer. Thermal pole tip protrusion can aggravate the contact of the transducer with the storage medium and can lead to increased or more rapid damage of the transducer.

These problems currently facing the magnetic storage device industry threaten to impede the ongoing progress in reliability, performance, and cost that has been achieved during recent years. Although many of these problems can be overcome to some degree using conventional head gimble assembly designs, it is unlikely that these problems can be successfully overcome while keeping costs for disk drive users down.

One approach that is currently being developed to lessen the effects of the challenges discussed above involves a technique called second stage actuation. Second stage actuation systems use a dual actuation method for controlling the horizontal tracking position of the head over a servo mark positioned on the surface of the storage medium. A coarse actuator, similar to a HGA, positions the recording head to a global position, and a fine actuator with a single, horizontal degree of freedom at the head positions the head and transducer to a fine position. While this technique can be adequately practiced in connection with previous versions of magnetic storage media, the increased density on newer discs requires closer tolerances on the fly height, as discussed above. As the fly heights of newer storage systems continually decrease, second stage actuation technology becomes increasingly inadequate, particularly in light of the fact that transducer positioning is limited to adjustment in only the horizontal direction.

Additionally, it is known that previous methods have been attempted to measure fly height of a recording head above the surface of a magnetic storage medium. These methods include calculations involving capacitance, ratios of certain harmonic amplitudes, and vibrational aspects of piezo-electric devices mounted on the recording head. However, these methods have proven inadequate in precisely controlling and calibrating fly height and other possible movements of the recording head in newer magnetic storage devices.

SUMMARY OF SELECTED EMBODIMENTS OF THE INVENTION

The present invention generally relates to improving the performance and use of magnetic storage media, such as hard disk drives. More specifically, the present invention is directed to a rotating magnetic storage medium having a recording head that is bi-directionally controlled with respect to the surface of a magnetic medium. The recording head utilizes an interleaver design that incorporates a plurality of flexure structures that enables the bi-directional movement of the recording head.

In one embodiment, a magnetic storage medium, such as a hard disk drive is disclosed. The hard disk drive includes a magnetic medium, such as a hard disk, that is accessed by a recording head. The recording head is supported by a head gimble assembly having a macroactuator that is movable to coarsely position the recording head with respect to the surface of the magnetic medium.

The recording head is also bi-directionally movable in order to precisely position a transducer of the recording head with respect to the magnetic medium surface. In one embodiment, this is achieved with an interleaver assembly that is included as a component of the recording head and is interposed between a slider body and the transducer.

The interleaver assembly includes a plurality of flexure beams that are arranged in a specified configuration in the interleaver so as to constrain movement of the interleaver in specified directions when a motional force is imposed on it. In one embodiment, the motional force is provided by one or more motor assemblies positioned in the interleaver and/or slider body. When the motional force is applied to the interleaver, the flexures constrain motion of the interleaver, and the transducer attached to the interleaver, in desired directions with respect to the magnetic medium surface. For instance, the flexures can selectively enable vertical or horizontal transducer movement with respect to the magnetic medium, while minimizing movement in undesired directions.

In other embodiments, methods are described for preparing, manufacturing, and optimizing the operation of a recording head having the interleaver assembly design described above.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore, intended to be considered limiting of its scope, the invention will be described and explained with additional specificity and detail through the use of the accompanying drawings in which:

FIG. 4b is an assembled perspective view of the recording head of FIG. 4a;

FIG. 5a is a front view of an interleaver assembly according to one embodiment;

FIG. 5b is a top view of the interleaver assembly of FIG. 5a;

FIG. 5c is a cross sectional view of the interleaver assembly taken along the line 5c—5c of FIG. 5a;

FIG. 5d is close-up view of a portion of a flexure assembly taken about line 5d—5d of FIG. 5c;

FIG. 5f is a side view of a portion of the recording head of FIG. 5a;

FIG. 8b is a side view of the interleaver assembly of FIG. 8a;

FIG. 9b is a side view of the interleaver assembly of FIG. 9a;

FIG. 12b is a simplified top view of the interleaver assembly of FIG. 12a;

FIG. 13b is a simplified top view of the interleaver assembly of FIG. 13a;

DETAILED DESCRIPTION OF SELECTED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1–23 depict various features of embodiments of the present invention, which is generally directed to structures and methods of manufacturing a recording head that uses off-axis flexure bending to move the recording head transducer with respect to a magnetic medium, such as a rotating disk, in a magnetic storage device. Examples of magnetic storage devices can include a hard disk drive used in one of a variety of electronic products. In particular, the structures and methods disclosed herein are preferably directed for use in a recording head having an integrated, bi-directional micropositioner. The micropositioner is configured to be selectively moved in two orthogonal directions with respect to the surface of the magnetic medium, thereby enabling greater precision in positioning a transducer located in the micropositioner near the magnetic medium surface. An overview of the operation and calibration of recording heads having an integrated micropositioner is included in U.S. patent application Ser. No. 10/342,920, filed Jan. 13, 2003, entitled "Integrated Recording Head Micropositioner for Magnetic Storage Devices," and U.S. patent application Ser. No. 10/775,406, filed Feb. 9, 2004, entitled "Method of Calibrating Magnetic Storage Medium Bi-Directional Recording Head" ("the '920 application"), which are incorporated herein by reference in their entirety.

Figure 1:
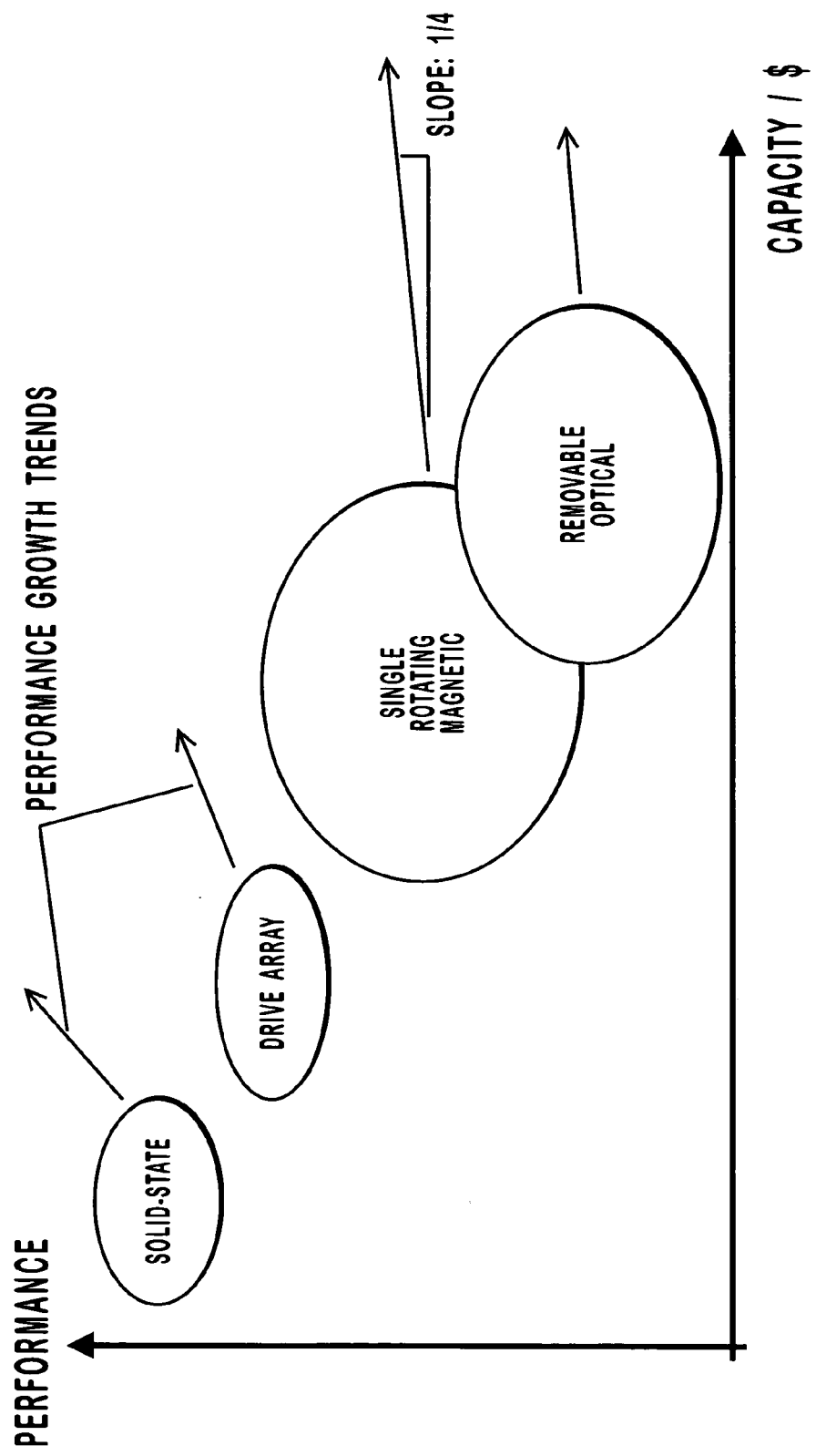
FIG. 1 is a graph that depicts relative cost and performance values of conventional data storage device technologies.
Figure 2:
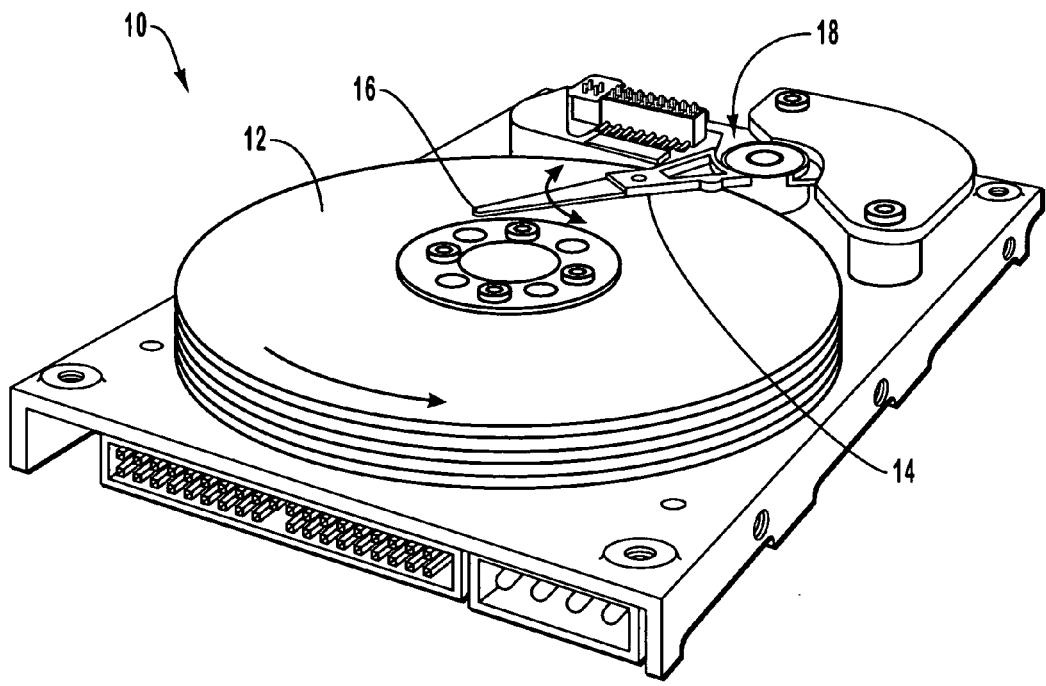
FIG. 2 is a perspective view of a conventional disk drive and head gimble assembly.
Figure 3:
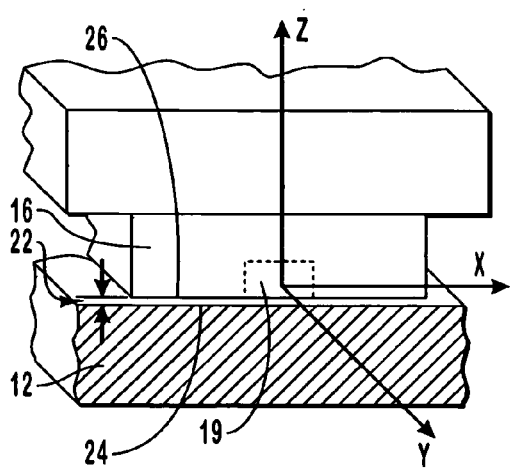
FIG. 3 is a perspective view of a recording head/magnetic storage medium interface of a conventional disk drive.

While FIGS. 2 and 3 illustrate conventional disk drives, these figures set forth a convention regarding a frame of reference that is useful in describing the methods of positioning and calibrating the transducers of the recording heads. As shown in FIG. 2, a rotating magnetic storage medium 12 rotates counterclockwise, such that elements on the storage medium that encode individual bits of data travel under the recording head 16 in a direction that is substantially parallel to the longitudinal axis of the arm of the head/gimble assembly ("HGA") 14. In other words, a particular track of the magnetic storage medium 12, which is concentric with the circumference of the magnetic storage medium, is substantially tangent to the longitudinal axis of the HGA 14 when the track is positioned under recording head 16. This motion of the magnetic storage medium 12 with respect to the HGA 14 defines a trailing edge or surface of the recording head 16 that is distal from the axis of rotation of the HGA 14.

FIG. 3 is a perspective view of the recording head, and shows an elevation of the trailing surface of the recording head 16. In FIG. 3, the motion of the illustrated portion of the magnetic storage medium 12 during operation is generally in the "y" direction, while the orientation of the data tracks of this portion of the magnetic storage medium is likewise substantially in the y direction. As shown in FIG. 3, the "z" direction is defined to be perpendicular to the surface of the magnetic storage medium 12. The "x" direction is defined to be substantially perpendicular to or lateral with respect to the orientation of the tracks. In other words, motion in the x direction can cause the transducer to be laterally moved between tracks or to be centered over a track; thus movement in the x direction is known as "track-to-track" movement. Because of the small angles involved, the motion of the transducer can be considered to be a translation in the x direction, regardless of whether the motion is a result of the actuation of the micropositioner integrated into the slider body of the recording head 16 or motion associated with the rotation of the HGA 14 about the axis of rotation of the HGA 14. The y-axis is defined to be perpendicular to both the x and z axes as shown in FIG. 3.

FIG. 3 also illustrates a "fly height" 22, which is defined to be the distance in the z direction between the surface 24 of the magnetic storage medium 12 and the adjacent bottom, or air bearing, surface 26 of the recording head transducer. FIG. 3 illustrates the general position of a transducer in region 19 and the relationship thereof to the x, y and z axes and the fly height 22.

The definitions and descriptions of track-to-track, fly height and related concepts as described above are applied in the following discussion in describing various features of embodiments of the present invention. Note that the principles of the present invention to be described below can be reliably used with existing recording media as well as with higher density recording media that will be developed in the future. Also, the discussion to follow focuses on the interaction of a recording head with a top surface of a magnetic storage medium. In other embodiments, however, it should be appreciated that magnetic storage devices having a plurality of recording heads operating in conjunction with a plurality of magnetic storage medium surfaces can also benefit from the present invention. Thus, the description contained herein is merely illustrative of the broader concepts encompassed by the present invention, and is not meant to limit the present invention in any way.

1. Interleaver Assembly with Flexures

Figure 4A:
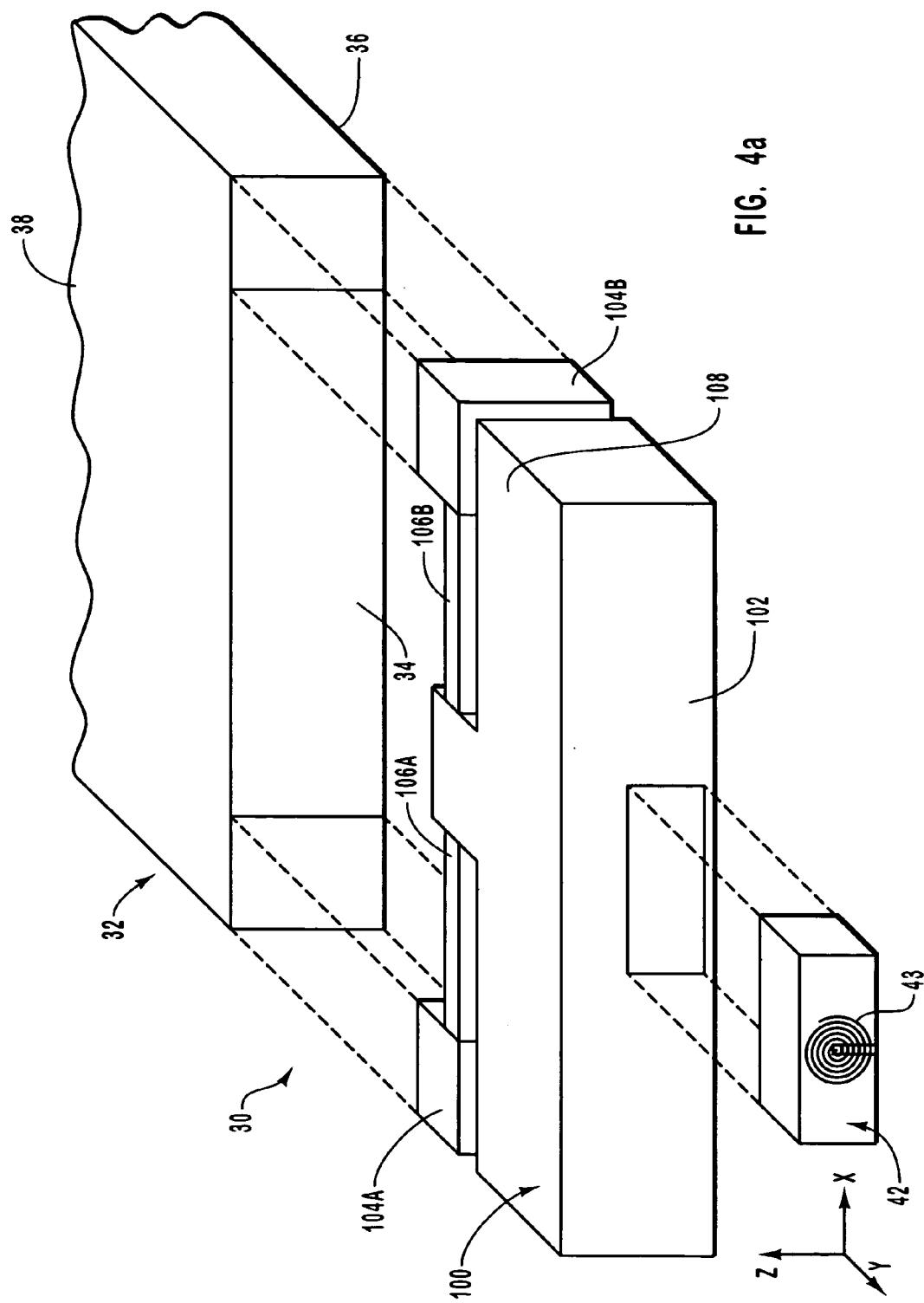
FIG. 4a is an exploded view of a portion of a recording head including a slider body, an interleaver assembly, and a transducer according to one embodiment.
Figure 4B:
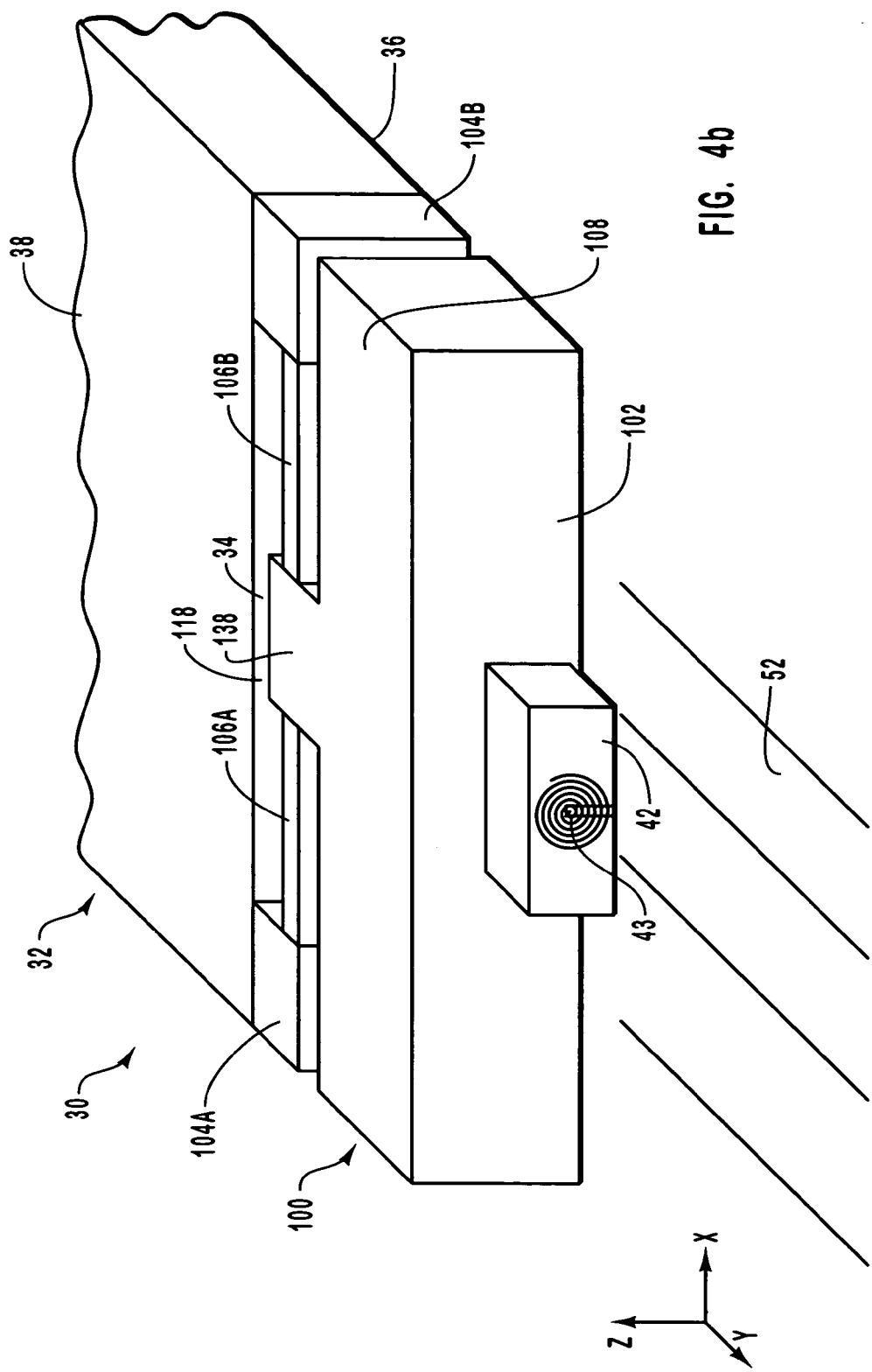

Reference is now made to FIGS. 4a and 4b, which show a general representation of a micropositioning recording head according to an embodiment of the present invention. As such, the recording head to be described is merely exemplary of those recording heads that fit within the description herein, and is not meant to confine the invention to only the illustrated implementation. In particular, a recording head is generally depicted at 30 and forms a component of a magnetic storage device, such as a hard disk drive (not shown) for use in reading and writing data to a magnetic medium (not shown here). The recording head 30 of the present embodiment generally includes a slider body 32, a transducer body 42, and an interleaver assembly 100. These components cooperate in providing bi-directional actuation of the recording head, and more particularly the transducer body, with respect to a surface 52 of a magnetic storage medium, shown in FIG. 4b. Each of these components, along with their mutual interaction with respect to one another, is explained below.

The slider body 32 includes a trailing surface 34 as shown in FIG. 4a. The slider body 32 is formed, for example, from alumina, alumina/TIC, another ceramic material, silicon, or silicon plus additional embedded circuitry. The slider body 32 has an air bearing surface 36, which, as shown in FIG. 4a, is positioned opposite a top surface 38. Though not shown, the top surface 38 can include a plurality of integrated circuit structures and other components for use in operating the recording head 30. The air bearing surface 36 in one embodiment defines an air bearing plane and maintains an appropriate fly height 22 (FIG. 3) by the generation of an air bearing or air cushion between the air bearing surface and the adjacent surface of the magnetic storage medium.

As shown, the transducer body 42 includes a transducer 43 that serves as a read/write component for the recording head 30 to read data from and record data to the magnetic storage medium. The transducer body 42 in one embodiment is attached to a rear end 102 of the interleaver assembly 100 in the configuration shown in FIGS. 4a and 4b, though other mounting schemes and configurations can also be used.

The interleaver assembly 100 is interposed between the slider body 32 and the transducer body 42 and serves as a means by which the transducer 43 can be bi-directionally moved with respect to the magnetic storage medium surface 52. As such, the interleaver assembly 100 of the present embodiment generally includes first and second interconnect regions 104A and 104B, first and second flexure assemblies 106A and 106B, and a body portion 108. Each of these components will be discussed below.

With continuing reference to FIGS. 4a and 4b, reference is now made to FIGS. 5a—5f, which show additional details regarding the interleaver assembly 100 and recording head 30. The interconnect regions 104 of the interleaver assembly 100 facilitate electrical connectivity between the interleaver assembly, the transducer 43, and the slider body 32. As such, each interconnect region 104 is positioned as to electrically connect with the slider body 32 via a plurality of electrical interconnects 110, or other suitable means. Though shown on a top surface, the electrical interconnects 110 can be located on other surfaces of the interconnect regions 104.

Figure 5E:
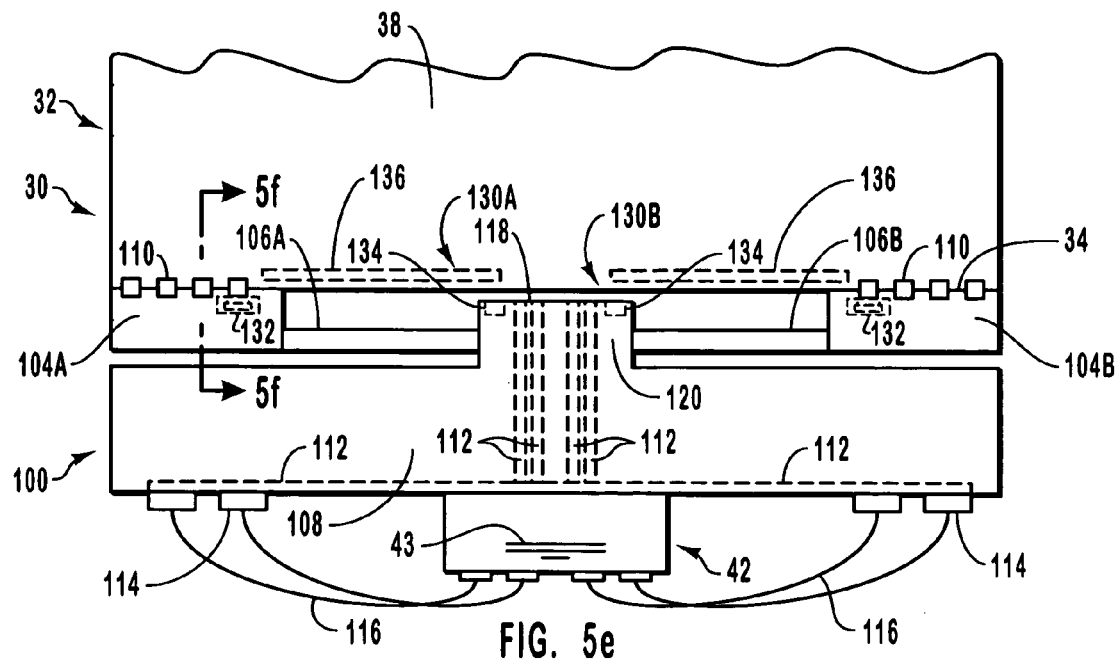
FIG. 5e is a top view of the recording head of FIG. 4b.
Figure 5F:
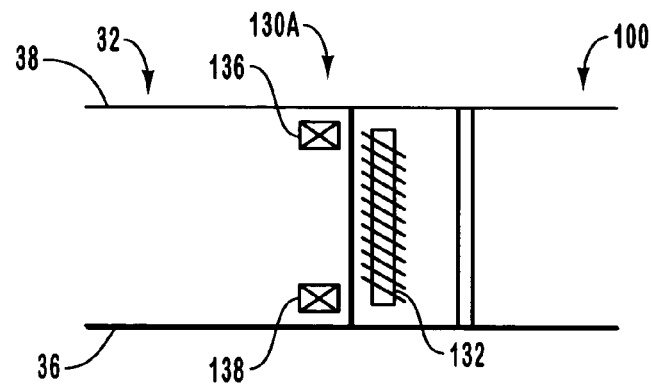

The body portion 108 of the interleaver assembly 100 serves as a mount for the transducer body 42, as has been discussed. As such, the body portion 108 includes a plurality of electrical vias 112 for the passage of electrical signals from the slider body 32, and interconnect region(s) 104 to the transducer 43. As shown in FIG. 5e, a plurality of bond pads 114 on the rear end 102 of the interleaver assembly 100 and wires 116 can provide interconnection of the transducer 43 with the electrical vias 112.

The body portion 108 is indirectly attached to each interconnect region 104A and 104B via the first and second flexure assemblies 106A and B. As such, the first flexure assembly 106A is attached to and interposed between the first interconnect region 104A and a central portion 120 of the body portion 108, while the second flexure assembly 106B is attached to and interposed between the second interconnect region 104B and the central portion. As will be described in greater detail, the flexure assemblies 106A and 106B include a plurality of resilient flexure beams 117, as shown in FIGS. 5a, 5c, and 5d, that can deform when subjected to a sufficient motional force. The flexure beams 117 of each flexure assembly 106A and B are configured such that their deformation causes movement of the body portion 108 and transducer 43 in specified directions with respect to the magnetic medium surface 52. In one embodiment, flexure of the flexure assemblies 106A and B results in selective transducer motion in a vertical, fly height direction, which corresponds to movement along the z-axis shown in FIG. 4b, and in a horizontal, track-to-track direction, which corresponds to movement along the x-axis. More details regarding the operation and manufacture of the flexure assemblies 106A and B are given further below.

The recording head 30 of the illustrated embodiment further includes first and second motor assemblies 130A and 130B to provide the motional force needed to enable flexing of the flexure assemblies 106A and B and corresponding micropositioning movement of the transducer 43. Each of the motor assemblies 130A and B includes several components, including one or more magnetic flux sources 132, and on inner closure bar 134, each of which are positioned on the interleaver assembly 100. The motor assemblies 130A and B further include a top closure bar 136 and bottom closure bar 138 which are both positioned in the slider body 32. In addition to this configuration, other configurations and structures can be included in the motor assemblies 130A and B. Various details regarding the relative positions of some of these components can be seen in FIG. 5F. More details relating to the structure and operation of the motor assemblies 130A and B will be given below.

Figure 6A:
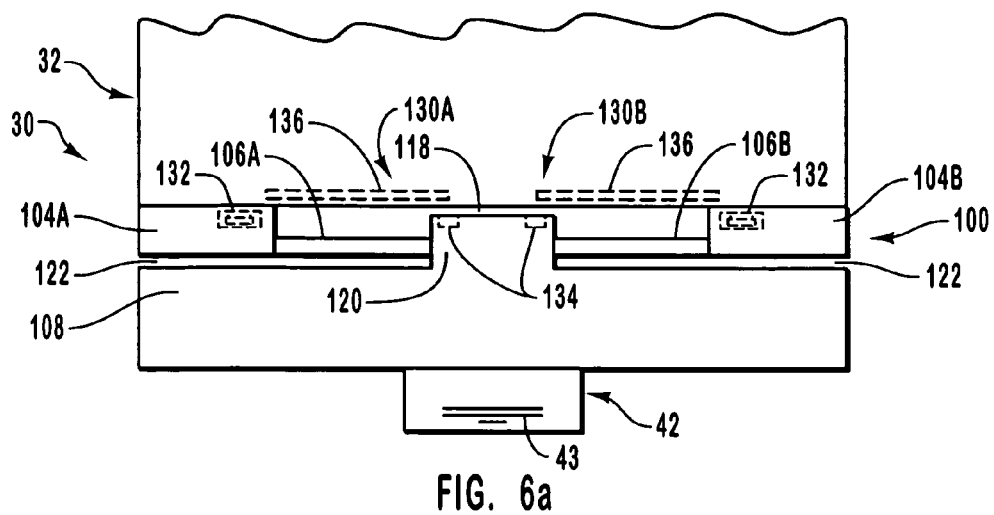
FIG. 6a is a simplified top view of the recording head of FIG. 4b in a first state, wherein flexures of the interleaver assembly are in an un-flexed position.
Figure 6B:
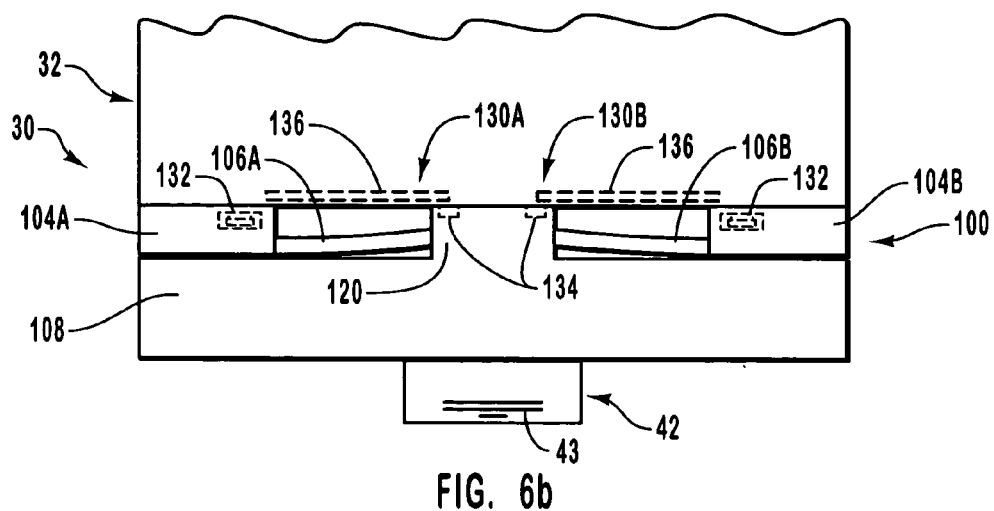
FIG. 6b is a simplified top view of the recording head of FIG. 4b in a second state, wherein the flexures of the interleaver assembly are in a flexed position.
Figure 6C:
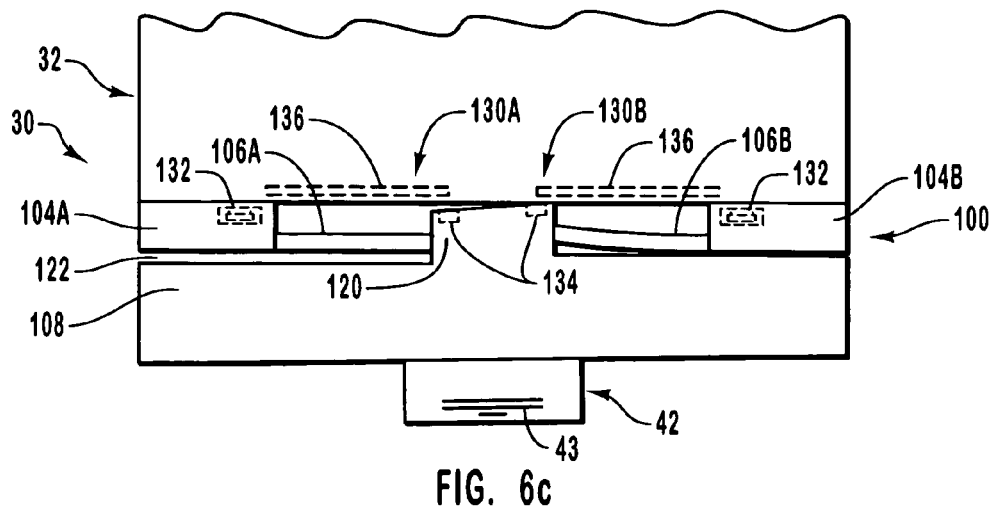
FIG. 6c is a simplified top view of the recording head of FIG. 4b in another state, wherein a only a portion of the flexures of the interleaver assembly are in a flexed position.

Together with FIGS. 5a–5f, reference is now made to FIGS. 6a–6c in describing various details regarding operation of the interleaver 100. As mentioned, the body portion 108 of the interleaver 100 is indirectly attached to each interconnect region 104A and B via the flexure assemblies 106A and B. The flexure assemblies 106A and B include a plurality of resilient flexure beams 117, as shown in FIGS. 5a, 5c, and 5d, that can deform when subjected to a sufficient force provided by the motor assemblies 130A and B or other suitable component. For example, FIG. 6a shows the interleaver assembly 100 in a non-actuated state, wherein a gap 118 exists between the central portion 120 of the body portion 108 and a corresponding portion of the slider body 32. In this state channel gaps 122 also exist between each of the interconnect regions 104A and B and the body portion 108. In contrast, FIG. 6b shows the interleaver assembly 100 in an actuated state, wherein the motor assemblies 130A and B have been activated to produce a motional force and cause deformation of both flexure assemblies 106A and B. When such deformation of the flexure beams 117 occurs, the size of the gap 118 is reduced until contact is made between the central portion 120 and the corresponding portion of the slider body 32. In turn, this causes movement of the body portion 108 in a specified direction according to the configuration of the flexure beams 117. Correspondingly, because of its attachment to the body portion 108, the transducer body 42 is also generally moved in the same direction as the body portion 108, this motion being determined by the configuration of the flexure beams 117. Note that both channel gaps 122 are eliminated in this state.

As noted above, the flexure beams 117 of each flexure assembly 106A and B are configured such that their deformation causes movement of the body portion 108 and transducer 43 in a specified direction with respect to the magnetic medium surface 52 (FIG. 4b). In one embodiment, deformation of the flexure assemblies 106A and B can result in transducer motion in a vertical fly height direction and/or in a horizontal, track-to-track direction. More details regarding operation and manufacture of the flexure assemblies 106 are given further below.

Note that the flexure beams 117 are resilient such that, when the motional force provided by the motor assemblies 130A and B is removed, the flexure beams return to their original position, thereby causing the body portion to return to its original position, as in FIG. 6a.

FIG. 6c shows partial actuation of the interleaver 100, wherein only the second motor assembly 130B is actuated to provide a partial motional force. This causes the central portion 120 of the body portion to contact the corresponding portion of the slider body at an angle, thereby only partly closing the gap 118. This further illustrates one principle of embodiments of the invention, wherein motion of the transducer can be affected in one or more of various ways according to the configuration and/or actuation of the interleaver.

Figure 7:
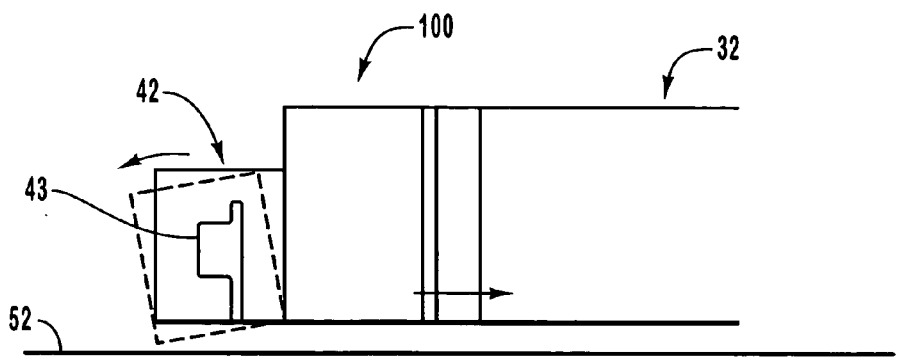
FIG. 7 is a side view of a recording head, depicting possible rotational movement of the transducer.
Figure 8A:
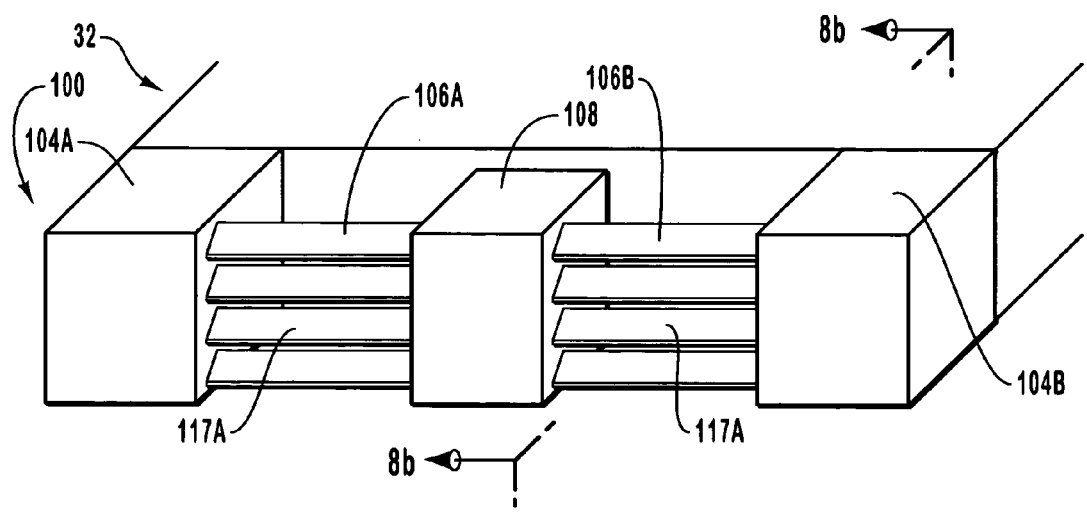
FIG. 8a is a simplified perspective view of a portion of an interleaver assembly according to one embodiment.
Figure 8B:
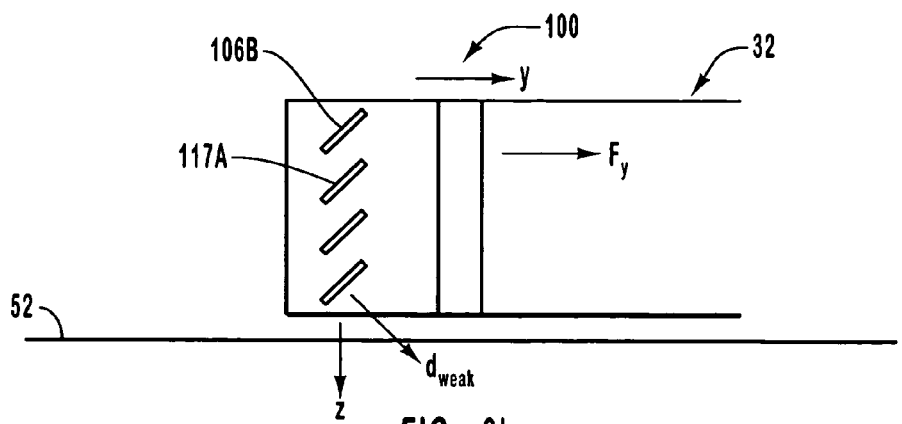

Reference is now made to FIGS. 7, 8a, and 8b. FIG. 7 shows possible rotation of the transducer body 42 with respect to the magnetic medium surface 52 when actuation of the interleaver 100 occurs, as discussed above. In accordance with embodiments of the invention, such rotation is desirably minimized by the configuration of the flexure assemblies 106 such that fly height and/or track-to-track movement of the transducer body 42 is achieved with respect to the magnetic medium surface 52 while at the same time minimizing the rotation of the transducer body as shown in FIG. 7.

FIGS. 8a and 8b depict various details regarding the flexure beams of the interleaver, according to one embodiment. These figures represent a cutaway view of the interleaver 100 to illustrate details of flexure beams 117A, which are shown in magnified view for purposes of illustration. As depicted, the sets of flexure beams 117A corresponding to the first and second flexure assemblies 106A and B are shown extending between the interconnect regions 104A and B and the central portion 120 of the body portion 108. Each flexure beam 117A is flattened and is positioned in a canted, or off-axis, orientation with respect to the magnetic medium surface 52. FIG. 8b shows the effect of such orientation of the flexure beams 117A such that, when actuation of the interleaver is commenced, the motional force provided by the motor assemblies 130A and B, indicated as FY, is imposed on the body portion 108 along the y-axis toward the slider body 32. This force acts upon the canted flexure beams 117A, such that deformation of the beams occurs. The deformation of the flexure beams 117A, however, is not in the direction of the force $F_y$, but rather along a weak flexure axis indicated by $d_{weak}$ in FIG. 8b. This results in a net displacement of the body portion 108, and hence the transducer body 42, along the z-axis (fly height direction), shown in FIG. 8b, along with some possible movement along the y-axis. At the same time, the flexure beam configuration shown here minimizes the rotation of the transducer body 42 depicted in FIG. 7. In this way, fly height and track-to-track motion of the transducer 43 with respect to the magnetic medium surface 52 can be selectively achieved. In one embodiment, the maximum deflection in the z-axis direction is achieved when the flexure beams 117A are canted at 45 degrees with respect to magnetic medium surface 52.

Figure 9A:
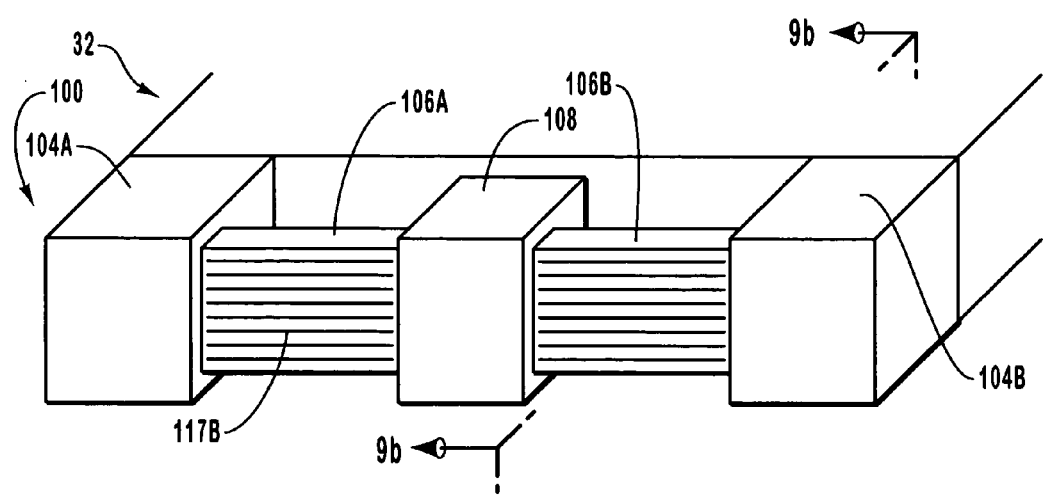
FIG. 9a is a simplified perspective view of a portion of an interleaver assembly according to another embodiment.
Figure 9B:
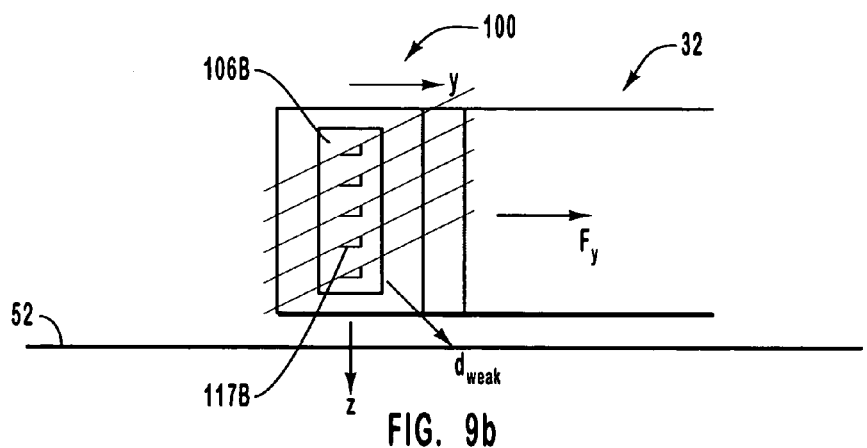

Reference is now made to FIGS. 9a and 9b, which depict the flexure assemblies 106A and B having flexure beams that are configured according to another embodiment. In detail, a plurality of flexure beams 117B are shown, wherein each beam includes an "L"-shaped cross sectional shape such that one cross sectional leg is longer than the other cross sectional leg. This produces in each flexure beam 117B a strong axis, as indicated by the angled lines passing through each beam, and a weak axis that is orthogonal to the strong axis. When bending of the flexure assemblies 106A and B is caused by the actuation of the motor assemblies 130A and B, the deformation of each flexure beam 117B occurs along the weak axis, as indicated by $d_{weak}$. Again, this desirably results in a net displacement of the body portion 108, and hence the transducer body 42, along the z-axis (fly height direction) shown in FIG. 9b, along with some possible movement along the y-axis. In this way, fly height and, if desired, track-to-track motion of the transducer 43 with respect to the magnetic medium surface 52 can be selectively achieved.

It should be appreciated that the size, shape, cross sectional design, orientation, and other details of the flexure beams and flexure assemblies can be varied from what is described herein. Moreover, combinations of different flexure beam configurations can be devised to suit the needs of particular applications. Thus, the depicted beam configurations are not meant to be limiting to the present invention.

Figure 10A:
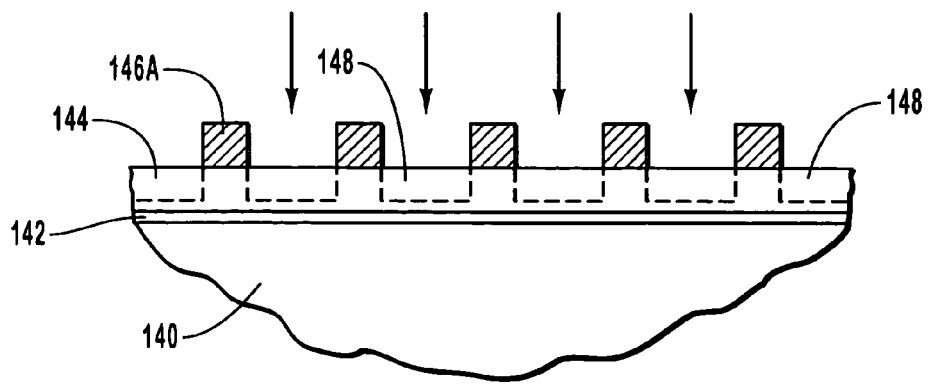
FIG. 10a is a representative view of one step in the manufacture of a flexure assembly in accordance with one embodiment.

Reference is now made to FIGS. 10a–10d, which depict various steps involved in the fabrication of flexure beams, such as those shown in FIGS. 9a and 9b, according to one embodiment. In FIG. 10a, a silicon base 140 is shown, having a silicon dioxide release layer 142 atop the silicon base. A polysilicon or single crystal layer 144 is deposited atop the release layer 142, and a resist layer 146A is intermittently applied in a specified pattern atop the polysilicon layer. A first etching procedure, indicated by the arrows in FIG. 10a, is then performed, wherein exposed areas 148 of the layer 144 are removed using reactive ion etching or other suitable technique.

Figure 10B:
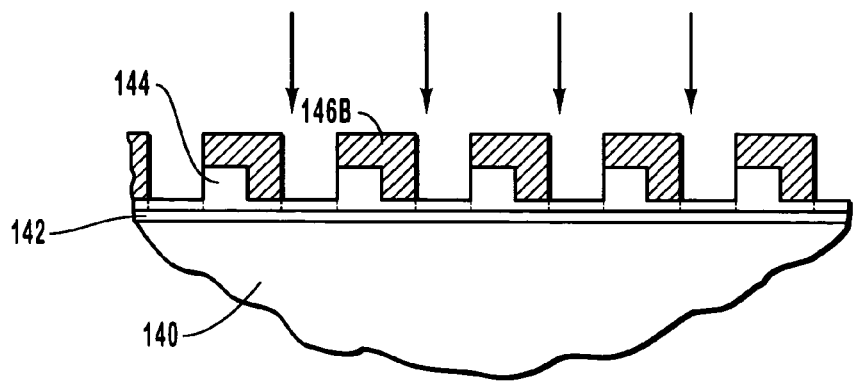
FIG. 10b is a representative view of another step in the manufacture of a flexure assembly in accordance with one embodiment.
Figure 10C:
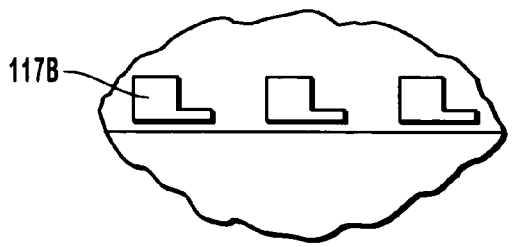
FIG. 10c is a side view of a flexure assembly resulting from the steps shown in FIGS. 10a and 10b.
Figure 10D:
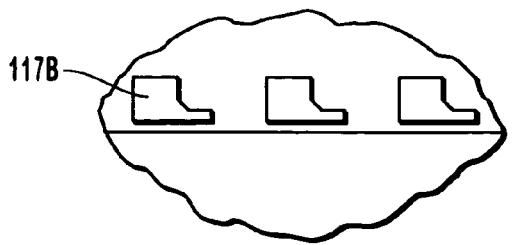
FIG. 10d is a side view of the flexure assembly of FIG. 10c following a subsequent manufacturing step.

In FIG. 10b, a new resist layer 146B is deposited atop selected portions of the layer 144 and a second etching procedure, indicated by the arrows in FIG. 10b, is performed to etch through the layer 144 and isolate the flexure beams 117. Finally, the flexure beams 117 are released by wet etching or other processing. This results in the separate flexure beams 117, as shown in FIG. 10c. Additional material can be added to the flexure beams 117, as shown in FIG. 10d, to strengthen the robustness of each flexure. The flexures can then be incorporated into flexure assemblies as desired. Of course, the technique as described herein in connection with these figures can be modified to accommodate the manufacture of flexure beams having other shapes, configurations, etc. In addition, other processes can be followed to manufacture the flexure beams, if desired, and materials other than those described herein can be used to manufacture the flexure beams in accordance with needs as appreciated by those skilled in the art.

Figure 11A:
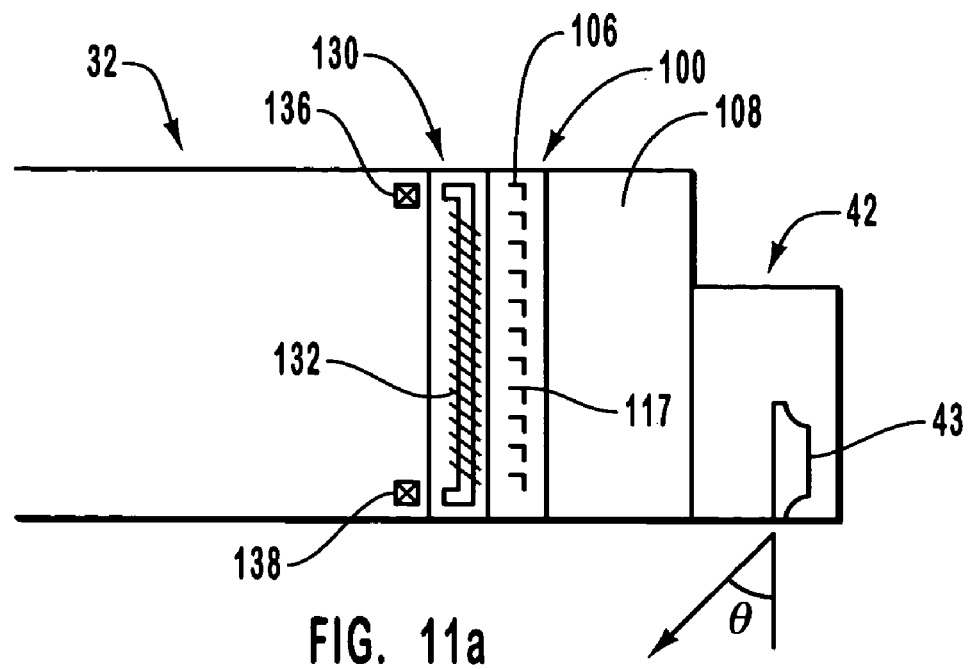
FIG. 11a is a side view of one embodiment of a recording head, showing one possible alignment of various components of the interleaver assembly.
Figure 11B:
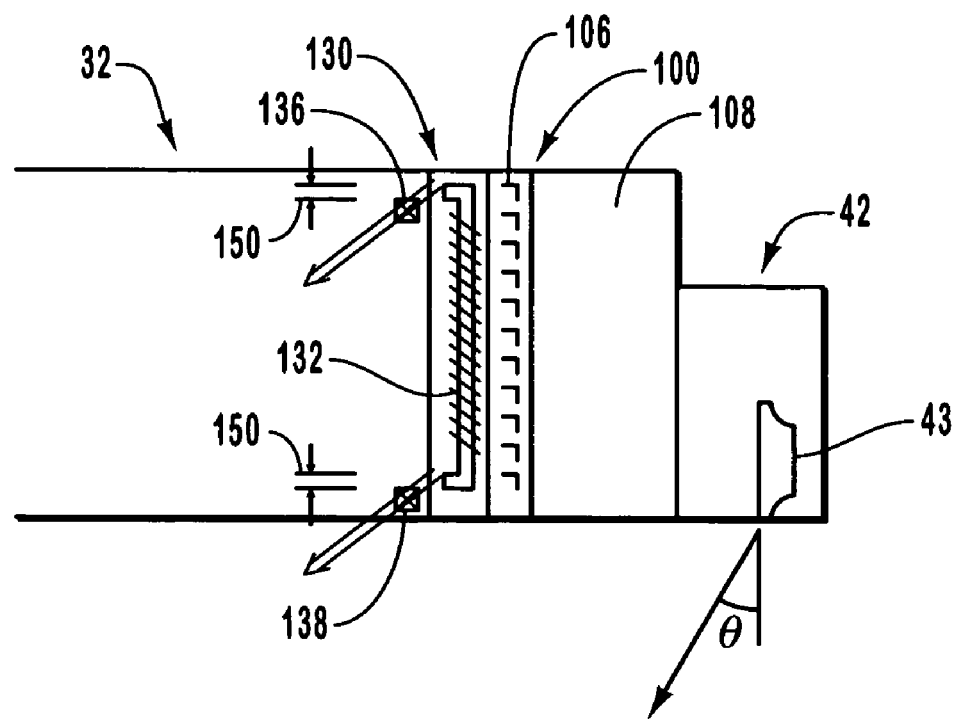
FIG. 11b is a side view of one embodiment of a recording head, showing another possible alignment of various components of the interleaver assembly.
Figure 12A:
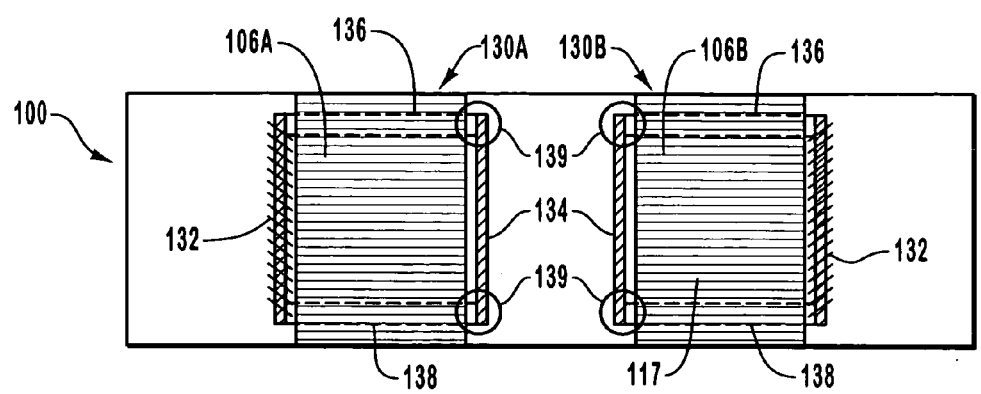
FIG. 12a is a simplified front view of an interleaver assembly, illustrating one possible coil and closure bar arrangement according to one embodiment.
Figure 12B:
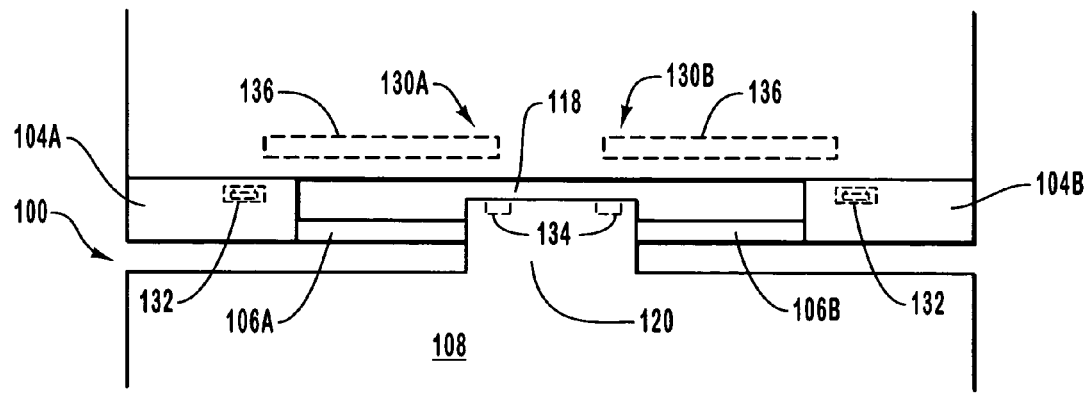

Reference is now made to FIGS. 11a, 11b, 12a, and 12b in describing various details regarding the motor assemblies 130A and B. As previously discussed, the motor assemblies are employed to impart a motional force to the interleaver assembly 100 in order to selectively move the transducer 43 in specified fly height and track-to-track directions. FIGS. 12a and 12b respectively show a simplified cutaway view and a top view of the interleaver assembly 100 and slider body 32 depicting one embodiment of the motor assemblies 130A and B. As shown each motor assembly 130A and B includes a magnetic flux source 132, such as a toroidal coil which are located on each of the interconnect regions 104A and B. Each motor assembly 130A and B further includes an inner closure bar 134 located on the central portion 120 of the body portion 108. Top closure bars 136 and bottom closure bars 138 are also shown in the slider body 32 in their positions with respect to the magnetic flux source 132 and the inner closure bar 134 of the respective motor assemblies 130A and B.

So configured, these components form two magnetic closure circuits, one for each magnetic flux source 132, when an electrical signal is run through the flux source, thereby generating an electromagnetic field, which in turn causes an attractive force between the closure bars 136 and 138 and the inner closure bar 134 of each motor assembly 130A and B. This attractive force is especially present at pull regions 139, as shown in FIG. 12a. As already discussed, the attractive force is the motional force that induces the movement of the flexure assemblies 106A and B, which in turn selectively moves the body portion 108 and the transducer-containing transducer body 42. Note that the magnetic closure circuits formed by the above components as shown in FIGS. 12a and 12b can be operated independently, if desired, to create an interleaver assembly movement such as that shown in FIG. 6c, and further enabling selective track-to-track motion of the transducer 43. Also, as shown in FIG. 5a, note that each magnetic flux source 132 is electrically supplied by two of the electrical interconnects 110.

FIGS. 11a and 11b depict side views of portions of one of the motor assemblies 130A or B, according to two embodiments. In the embodiment depicted in FIG. 11a, the top and bottom closure bars 136 and 138 of the slider body 32 are laterally aligned with the ends of the corresponding magnetic flux source 132. When the magnetic flux source 132 is energized, a motional force is created by virtue of the attraction between the flux source and the top and bottom closure bars 136 and 138 is directed in a substantially horizontal direction. As already explained, the flexure assemblies 106A and B alter the direction of the resultant movement in an angled direction as shown by the arrow in FIG. 1a, at an angle θ.

In contrast, FIG. 11b depicts the top and bottom closure bars 136 and 138 as being vertically offset a predetermined distance 150 from the ends of the magnetic flux source 132. When the magnetic flux source 132 is energized in this configuration, the motional force that is created is partially directed downward, as shown by the arrows across the closure bars 136 and 138. When the flexure assemblies 106A and B alter the direction of this force, the resulting movement of the transducer body 42 is substantially and desirably more vertical, as indicated by the angle θ in FIG. 1b.

In one embodiment, the inner closure bars 134 shown in FIGS. 12a and 12b can be replaced by additional magnetic flux sources, thereby providing more motional force for adjusting the position of the transducer 43, if desired. In this cause, the inner magnetic flux sources are electrically supplied from the interconnects 110 (FIG. 5e) via one or more of the flexure beams 117 of the corresponding flexure assembly 106. Also, in yet other embodiments, the magnetic flux sources, instead of being located on the interleaver assembly, can be positioned on the slider body, with the corresponding top and bottom closure bars positioned on the interleaver assembly. These and other modifications that reside within the principles of the teachings of the present embodiments are therefore contemplated as part of the invention.

Figure 13A:
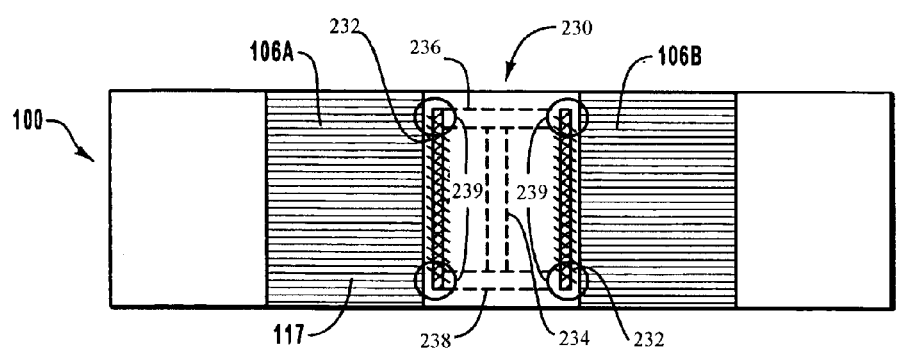
FIG. 13a is a simplified front view of an interleaver assembly, illustrating another possible coil and closure bar arrangement according to another embodiment.
Figure 13B:
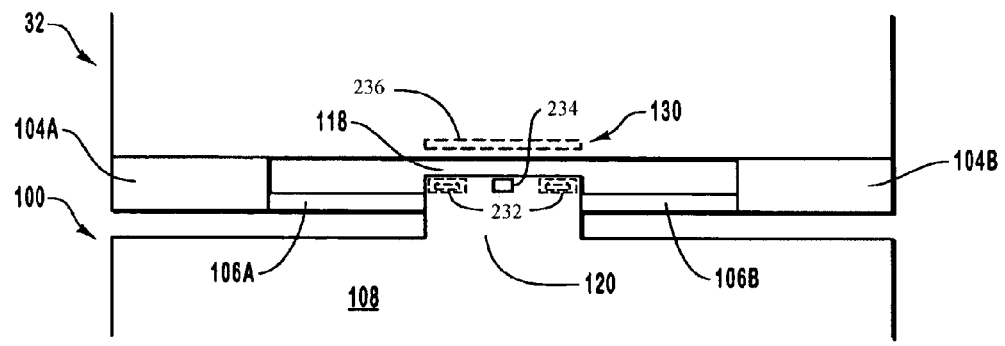

Reference is now made to FIGS. 13a and b, showing another embodiment of a motor assembly 230. The motor assembly 230 of FIGS. 13a and b include two magnetic flux sources 232 that are positioned in the central portion 120 of the body portion 108 of the interleaver assembly. A top closure bar 236 and a bottom closure bar 238 are positioned in the slider body 32 proximate the magnetic flux sources 232, and an inner closure bar 234 is positioned in the body portion central portion 120 to form the magnetic closure loop, as shown. One or both of the magnetic flux sources 232 can be actuated to selectively move the interleaver assembly 100 via the flexure assembly 106, thereby selectively adjusting the position of the transducer.

Note that the magnetic flux sources 232 in FIGS. 13a and b are positioned within the flexure assemblies 106A and B. In one embodiment, electrical connection of the magnetic flux sources 232 with the electrical interconnects 110 (FIG. 5a) can be achieved through at least some of the flexure beams 117 of the flexure assemblies 106A and B. For the flexure beams 117 to be able to carry electrical current to the toroidal coils 232, the flexure beams are manufactured to be electrically conductive by, for example, forming the beams from doped polysilicon or implanted single crystal silicon.

Figure 14:
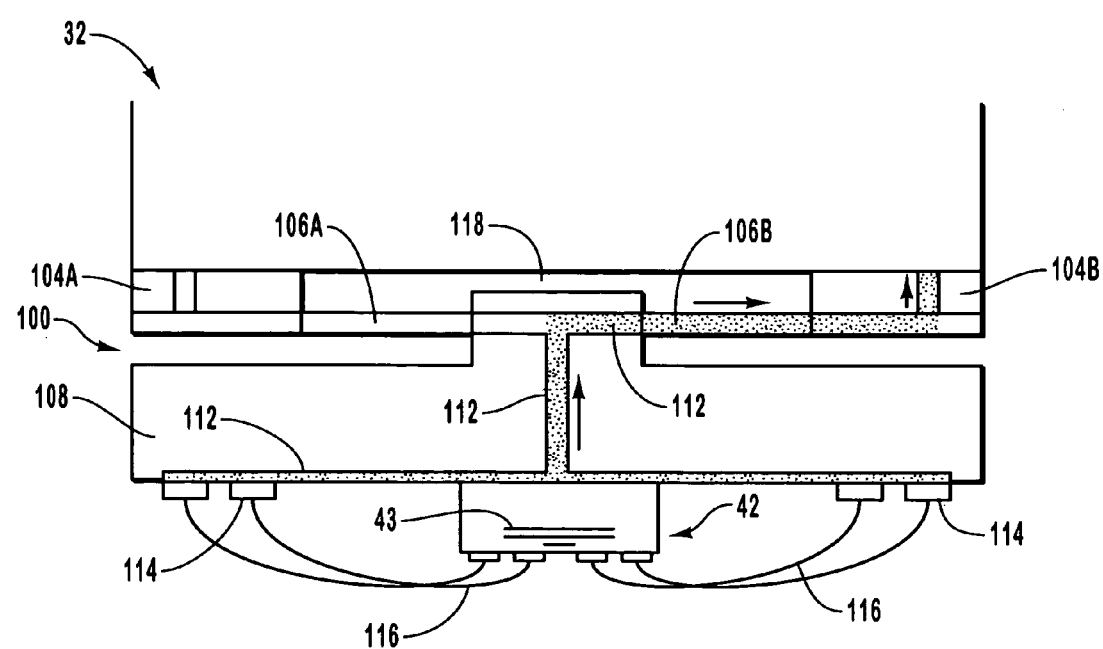
FIG. 14 is a simplified top view of a portion of a recording head, showing one possible electrical signal path through the interleaver assembly, according to one embodiment.
Figure 15:
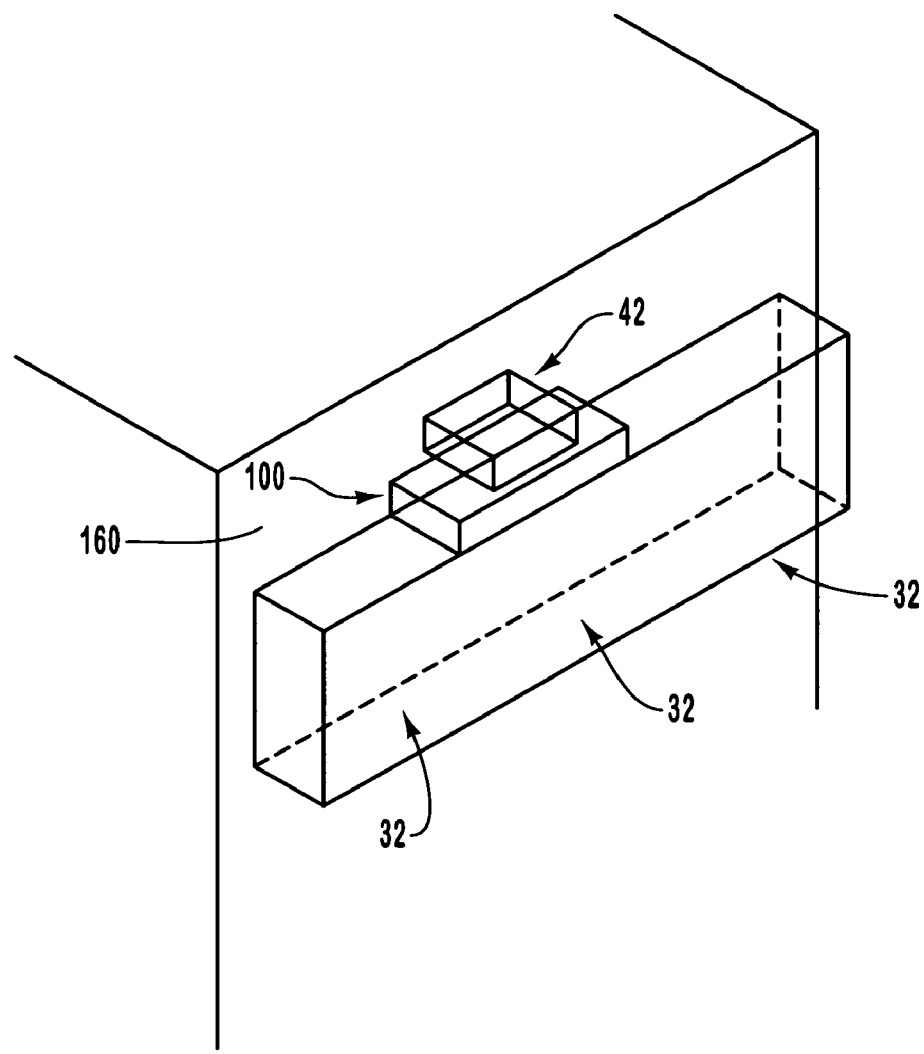
FIG. 15 is a simplified perspective view of various details regarding an alignment procedure for aligning the interleaver assembly with the slider body of a recording head, according to one embodiment.

More generally, electrically conductive flexure beams 117 (FIG. 5a) of the flexure assemblies 106A and B, together with one or more of the electrical vias 112, can be used in one embodiment to pass electrical signals, such as transducer read and write signals, between the slider body 32 and the transducer 43, as shown in FIG. 14. This configuration helps eliminate any extraneous external bias on transmitted electrical signals by eliminating additional lead wires and connections. Thus, these and other electrically conductive uses for the flexure assemblies are contemplated as comprising part of the present invention.

It is noted that challenges generally can exist with magnetic motor assemblies, such as those described above, in that their operation is typically nonlinear with respect to gap spacing. In other words, the amount of force required to change gap spacing between the slider body and the body portion of the interleaver varies nonlinearly with the gap spacing itself. A number of methods can be used to minimize this effect, including the use of smaller closure bars or designing the shape of the closure bars for specified magnetic saturation in particular regions.

2. Recording Head Alignment

Together with FIG. 5e, reference is now made to FIGS. 15–18. The size of the gap 118 (FIG. 12B) is determined in one embodiment according to several factors, including specific product needs, the desired range of track-to-track motion, the amount of desired transducer recession with respect to the slider body, and the aggregation of tolerances during recording head manufacture. In one embodiment, it is desirable to manage these factors in order to minimize the gap size, the amount of current required to close the gap 118 by the motor assembly 130, and the stiffness of the flexure beams 117. These aims can be met by a "light touch" alignment method shown in FIG. 15 that is suitable for aligning and connecting the interleaver assembly 100 to the slider body 32. A row of slider bodies 32 are first vacuum chucked against a flat surface, such as a precision ground plate 160. The interleaver assembly 100 and transducer body 42, previously joined together, are then brought into contact with the ground plate 160 and moved toward the slider body 32 until contact with the slider body 32 is established as sensed by a piezo or other suitable force sensing device. A laser or other localized heating device can then be used to adhere the interleaver assembly 100 to the slider body 32 by locally heating adhesive material proximate the interconnect regions 104A and B (FIG. 12B) of the interleaver assembly. This results in the configuration shown in FIG. 15.

Figure 16A:
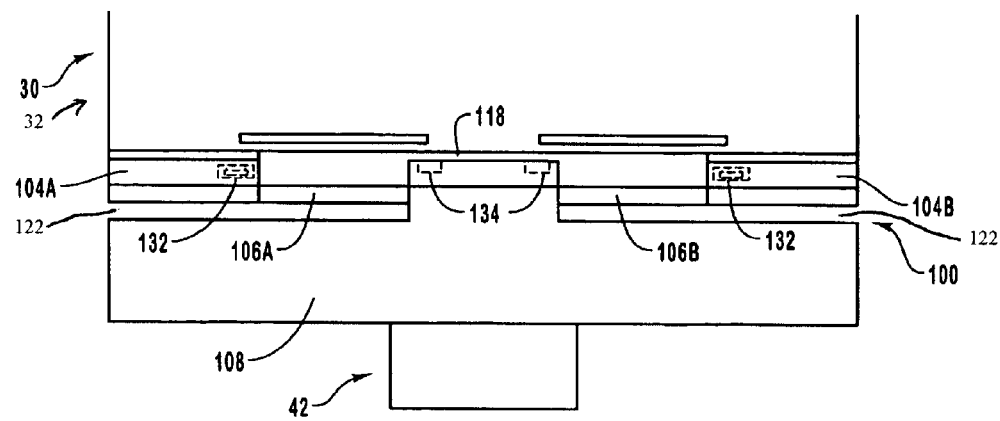
FIG. 16a is a simplified top view of various details regarding one step in an alignment procedure for aligning the interleaver assembly with the slider body of a recording head, according to one embodiment.
Figure 16B:
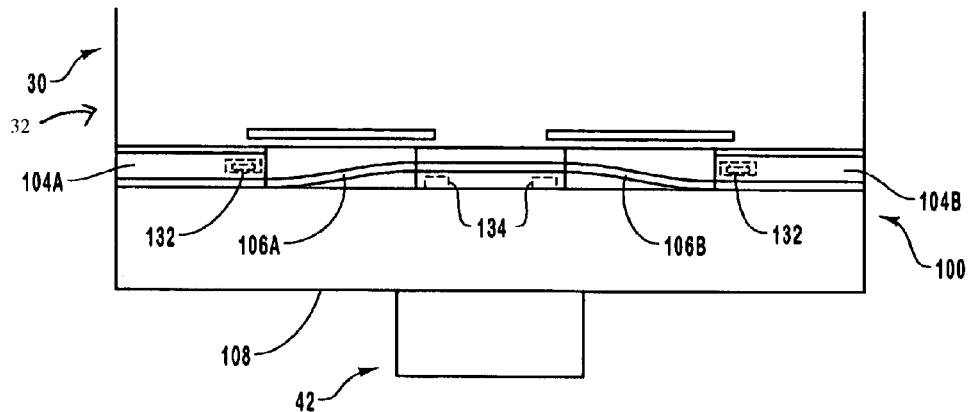
FIG. 16b is a simplified top view of various details regarding another step in an alignment procedure for aligning the interleaver assembly with the slider body of a recording head, according to one embodiment.

Reference is now made to FIGS. 16a and 16b. In another embodiment, procedures can be performed to reduce the undesirable stacking of tolerances, referred to above, during recording head manufacture. First, the slider body 32 is proximately aligned with the interleaver assembly 100 and attached transducer body 42, as shown in FIG. 16a. A physical force is then applied to the interleaver assembly 100 and/or transducer body 42 in order to deflect the flexure assemblies 106A and B and cause the central portion 120 of the body portion 108 to contact the corresponding portion of the slider body 32, thereby temporarily eliminating the gap 118 and channel gaps 122, as in FIG. 16b. Heat is then applied to electrically connect the interconnect region 104 of the interleaver assembly 100 with the slider body 32 via the electrical interconnects 110 (FIG. 5e), which are composed of AuSn or other suitable material. This technique enables precise electrical interconnection to be achieved between the interleaver assembly 100 and the slider body 32, which in turn enables the size of the gap 118 to be defined by the tolerances and flatness of the flexure assembly 106 and the motor assembly 130, and not by the method of assembly.

Figure 17:
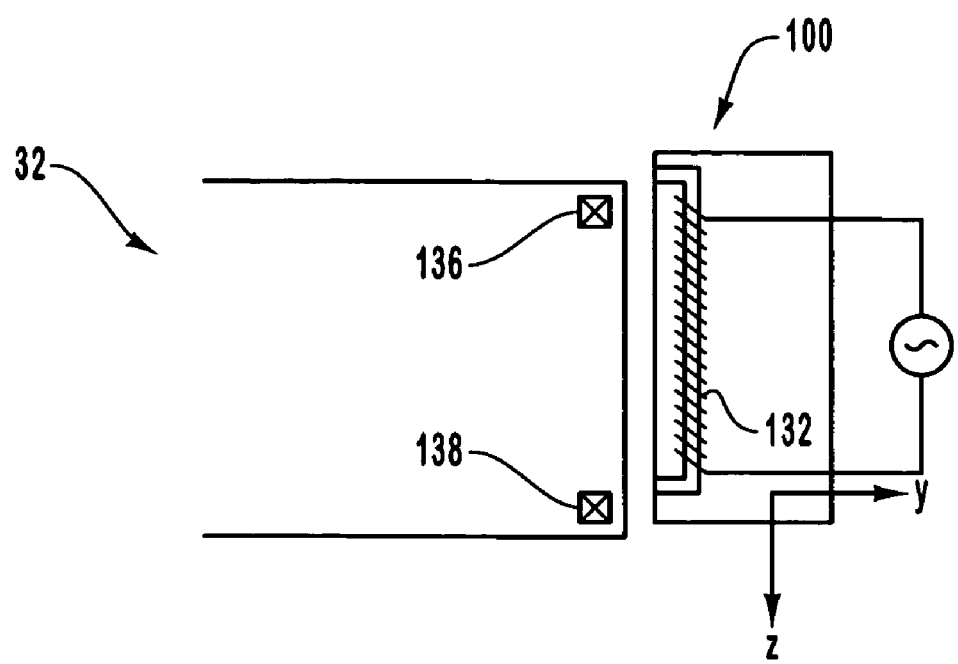
FIG. 17 is a simplified top view of various details regarding an alignment procedure for aligning the interleaver assembly with the slider body of a recording head, according to one embodiment.

FIG. 17 illustrates an "inductive feedback" method, according to another embodiment, for aligning and connecting the interleaver assembly 100 to the slider body 32. With this method, the interleaver assembly 100 is moved in the y-z plane while the inductance of a magnetic flux source 132, such as a toroidal coil, of the interleaver assembly is monitored, as indicated in FIG. 17. The magnitude of the toroidal coil inductance varies as a function of its distance with respect to the top and bottom closure bars 136 and 138 in the slider body 32. A maximum inductance value corresponds to a minimization of distance between the toroidal coil 132 and the top and bottom closure bars 136 and 138, which in turn corresponds to optimum alignment between the components. Once optimum alignment is achieved, the interleaver assembly 100 can be bonded with the slider body 32.

Figure 18A:
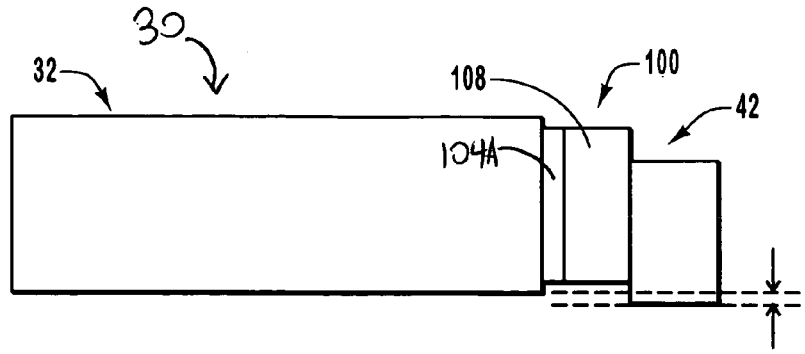
FIG. 18a is a simplified side view regarding one step in an alignment procedure for aligning the transducer and interleaver assembly with the slider body of a recording head, according to one embodiment.
Figure 18B:
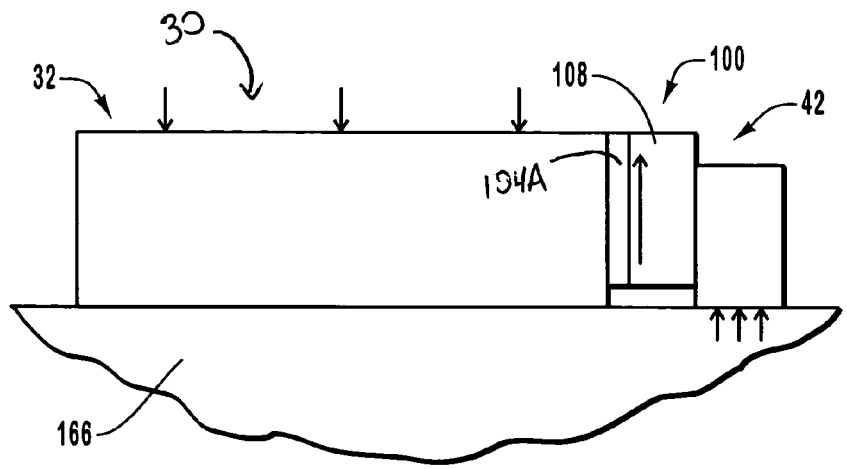
FIG. 18b is a simplified side view regarding another step in an alignment procedure for aligning the transducer with the slider body of a recording head, according to one embodiment.
Figure 18C:
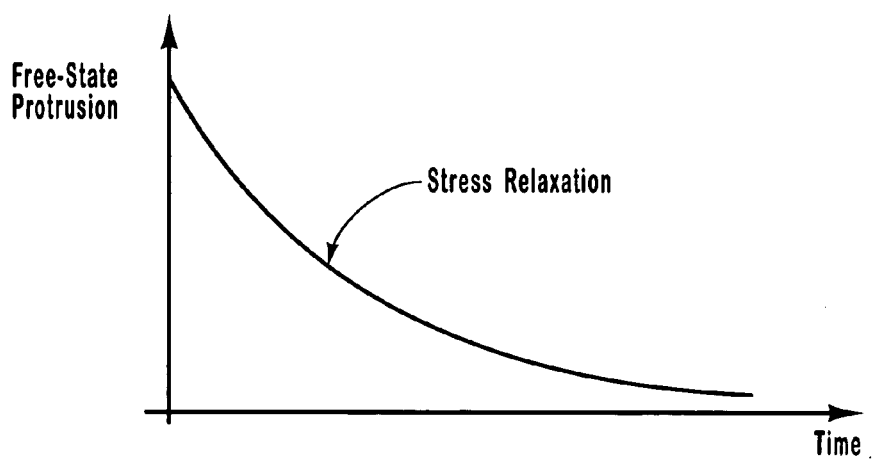
FIG. 18c is a graph depicting the stress relaxation resulting from the steps shown in FIGS. 18a and 18b.

After assembly of the recording head 30 is completed using one or more of the above methods, "stress relaxation" techniques as illustrated in FIGS. 18a–c can be performed in one embodiment to improve the alignment of the recording head components. First, the transducer body 42, interleaver assembly 100, and slider body 32 are assembled as the recording head 30 such that a bottom surface of the transducer body protrudes beyond the bottom surfaces of the slider body and interleaver assembly, as shown by the dashed lines in FIG. 18a. This protrusion is performed before any lapping processes are performed on the transducer body 42. The recording head 30 is then placed on a flat surface, such as an optical flat 166, while it is subjected to an annealing process for a predetermined amount of time while a downward force is applied to the slider body 32. The downward force imposes a shearing force on the interconnect regions 104A and B and the electrical interconnects 110 (FIG. 5e) located proximate the interconnect regions. This process causes a slight but desirable re-orientation of the transducer body 42 with respect to the slider body 32, and eventually allows the transducer body to align itself with the slider body, as represented in the graph shown in FIG. 18c.

3. Transducer Motion Adjustment

Figure 19A:
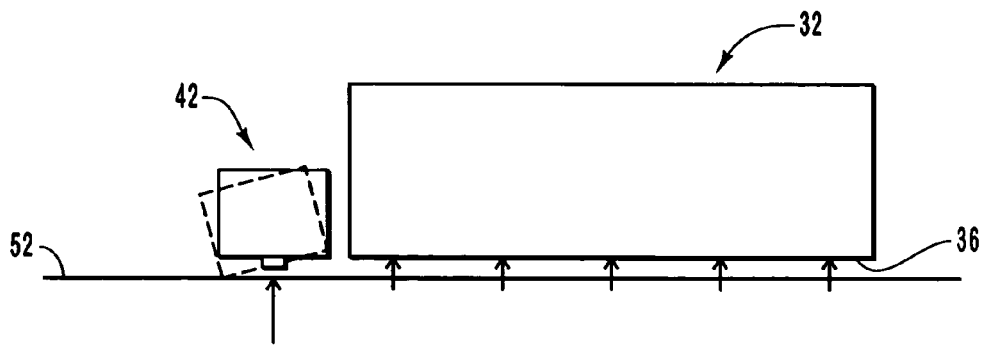
FIG. 19a is a representative view illustrating various details regarding compliance aspects of a recording head according to one embodiment.
Figure 19B:
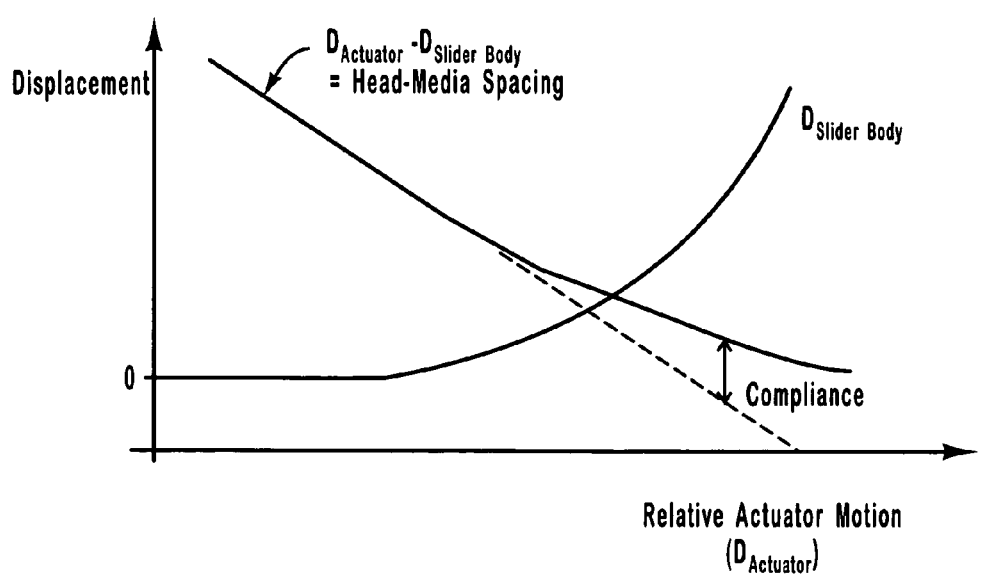
FIG. 19b is a graph depicting various details regarding compliance aspects of the recording head shown in FIG. 19b.

During operation of a magnetic storage device utilizing a recording head configured in accordance with the embodiments of the invention, it is desired that the transducer be configured in terms of positional resolution and track following ability such that it can substantially maintain constant spacing with respect to the magnetic medium surface. Moreover, such spacing must typically be maintained and adjusted at a frequency exceeding the capability of typical recording head technologies. Such constant spacing is at least partially achieved through the use of air bearing techniques as illustrated in FIG. 19a, wherein in response to movement of the transducer body 42 toward the magnetic medium surface 52 (shown in dashes), a compensating air bearing force is imposed on the transducer body to counteract the movement and maintain spacing between the magnetic medium surface and the transducer body. These forces are in addition to air bearing forces acting on the slider body 32. These forces and associated compliance values are set forth in the graph of FIG. 19b.

The air bearing techniques discussed above can be further assisted by the flexure assemblies 106A and B (FIGS. 5a, 5e). In detail, the micropositioning of the transducer body in the fly height direction relatively closer to the magnetic medium surface 52 results in an air bearing force opposing the transducer body movement. The flexure beams of the flexure assemblies 106A and B, such as the flexure beams 117B in FIGS. 9a and 9b, can be oriented such that the opposing air bearing force is imposed on the flexure assemblies along the weak axes of the flexure beams. This opposing force can be compensated for through increased actuation of the transducer body via the motor assemblies 130A and B. The strong axes of the flexure beams 117, however, will prevent excessive and undesired rotation of the transducer body 42 with respect to the magnetic medium surface 52, thereby preserving adequate spacing between the surface and the transducer body.

In one embodiment, a specified flexure assembly is used to achieve the above results, wherein the specified flexure assembly includes approximately 40 stacked flexure beams having a design similar to those shown in FIGS. 9a and 9b, each flexure beam having a thickness of approximately 2–3 microns, and a length of approximately 8–10 microns. This configuration provides a compliance ratio, i.e., the ratio of normal actuator forces required for an increment of linear y-directed motion versus the interface force required to resist such motion, of roughly 10:1. The rotational component of the y-directed motion for this configuration is approximately ⅕ of the linear motion, indicating that transducer body rotations will be small, as desired.

Figure 20A:
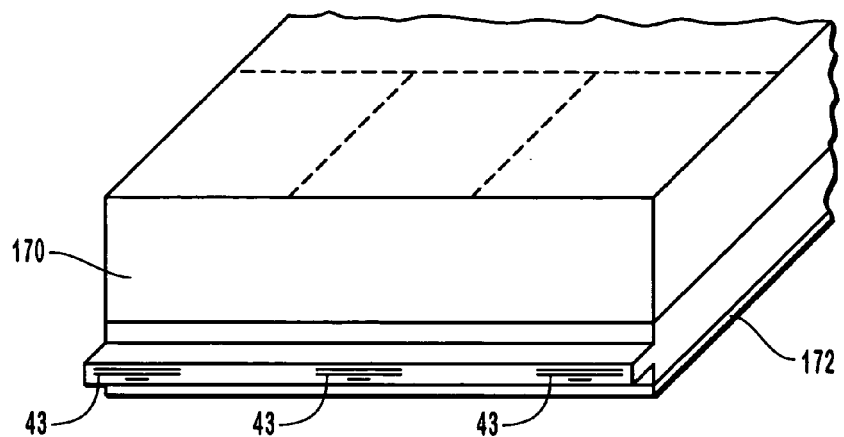
FIG. 20a is a simplified perspective view of one step in the fabrication of a portion of a transducer, in accordance with one embodiment.
Figures 20B, 20C, 20D:
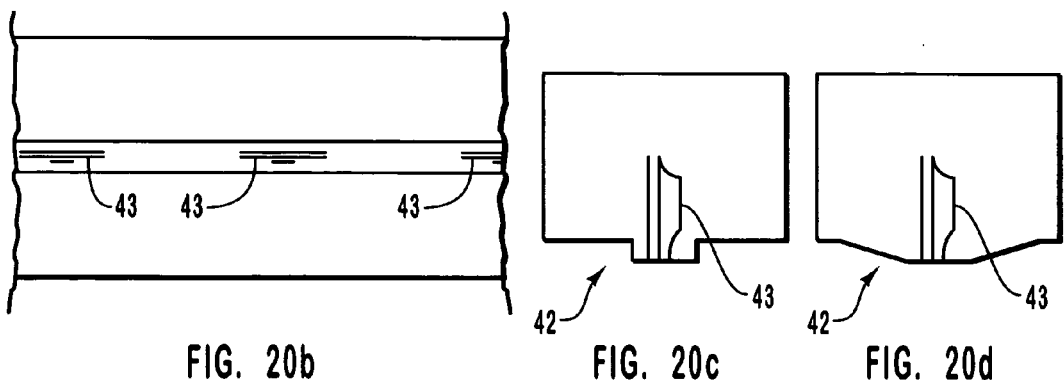
FIG. 20b is a simplified perspective view of another step in the fabrication of a portion of a transducer, in accordance with one embodiment.
FIG. 20c is a side view of one transducer manufactured in accordance with the steps shown in FIGS. 20a and 20b.
FIG. 20d is a side view of another transducer manufactured in accordance with the steps shown in FIGS. 20a and 20b.

Reference is now made to FIGS. 20a–20d, which depict an additional measure to reduce transducer body sensitivity to rotational changes, and to ensure that the transducer body 42 has a consistent and well developed pressure region under the transducer body. FIG. 20a illustrates a series of transducers 43 sandwiched between a sacrificial wafer 170 and a substrate 172 during manufacture. As shown, the material proximate the transducers 43 is selectively removed during the grinding of the transducer. A very tightly controlled depth is set up in this process, by first grinding the stripe height of the transducer 43 optically, as shown in FIG. 20b, followed by grinding specified edge features in the transducer body 42 such as the step formation, shown in FIG. 20c. Grinding of the edge features is performed accurately, due to the fact that the stripe height of the transducers is defined pervious to the grinding. This information is then used to shape the areas proximate the transducer 43.

In another embodiment, an angular surface is ground in the transducer body 42 on either side of the transducer 43, as in FIG. 20d. This design simplifies manufacturing of the transducer and, like the shape in FIG. 20c, offers an advantageous air bearing profile for the transducer body. In particular, the angular surfaces in FIG. 20d can be used to maintain air bearing pressure under the transducer body 42, which in turn assists in counteracting undesired rotation of the transducer body 43 and also increases the effective resolution of the transducer 43. The angle of the transducer body surfaces shown in FIG. 20d can range in one embodiment from approximately 1 to 100 milliradians.

4. Tribological and Reliability Enhancements

Figure 21A:
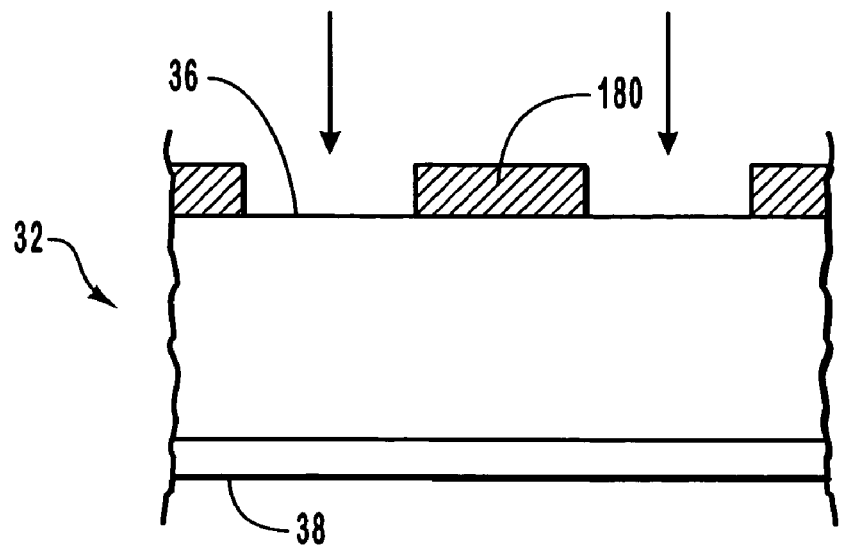
FIG. 21a is a simplified side view of one step in the fabrication of air bearing surfaces on the slider body of a recording head, in accordance with one embodiment.
Figure 21B:
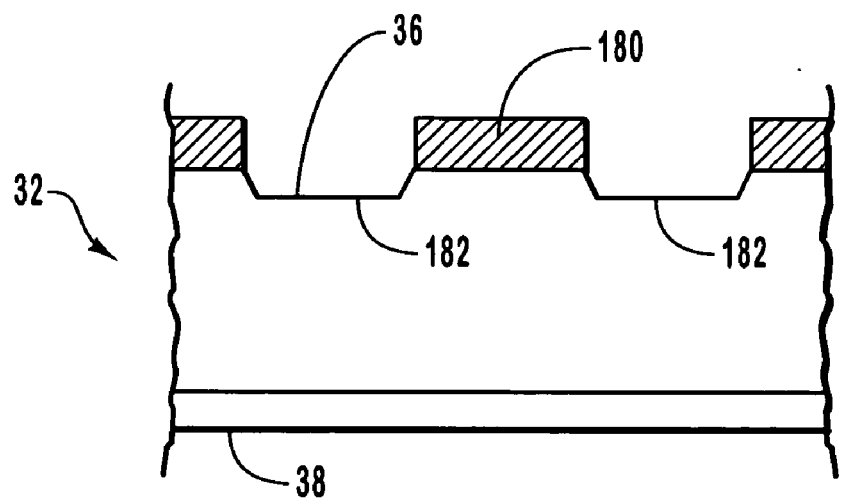
FIG. 21b is a simplified side view of one step in the fabrication of air bearing surfaces on the slider body of a recording head, in accordance with one embodiment.

Reference is now made to FIGS. 21a and 21b. In one embodiment, various air bearing features are defined on the bottom, or air bearing surface 36, of the slider body 32 of a recording head. Air bearing surfaces made in the manner to be described here are configured to improve the tribological performance of the slider body 32, including the maintenance of consistent flying heights, the elimination of material re-deposition, and the reduced collection of organic materials within the air bearing features during operation of the magnetic storage device (not shown).

The air bearing features that are formed on the slider body air bearing surface 36 in the present embodiment are produced using wet etching techniques. First, the air bearing surface 36 of the slider body 32 is properly aligned with respect to the top surface 38, which may contain a plurality of integrated circuits and other devices. A resist layer 180, such as a photoresist or photomask, is then applied in a prescribed pattern on the air bearing surface 36 of the slider body 32, which in the illustrated embodiment is formed from silicon. The air bearing surface 36 is then wet-etched, indicated by the arrows in FIG. 21a, to a prescribed depth, creating a plurality of air bearing features 182. As the slider body 32 in the illustrated embodiment is composed of silicon, the side walls of the air bearing features 182 are sloped at an angle of approximately 54.1 degrees, seen in FIG. 21*b*, which corresponds to the crystal planes present in silicon. This results in shallow, clean, and well-controlled cavity surfaces that improve the tribological performance of the slider body 32 and recording head (not shown). Following the wet-etch procedure, the resist layer 180 is removed, and second and third wet-etch procedures can be performed as needed. This method benefits from the fact that it does not require steppers, ion mills or reactive ion etch tools, making it an economical means by which air bearing surfaces can be produced on recording head components.

Figure 22A:
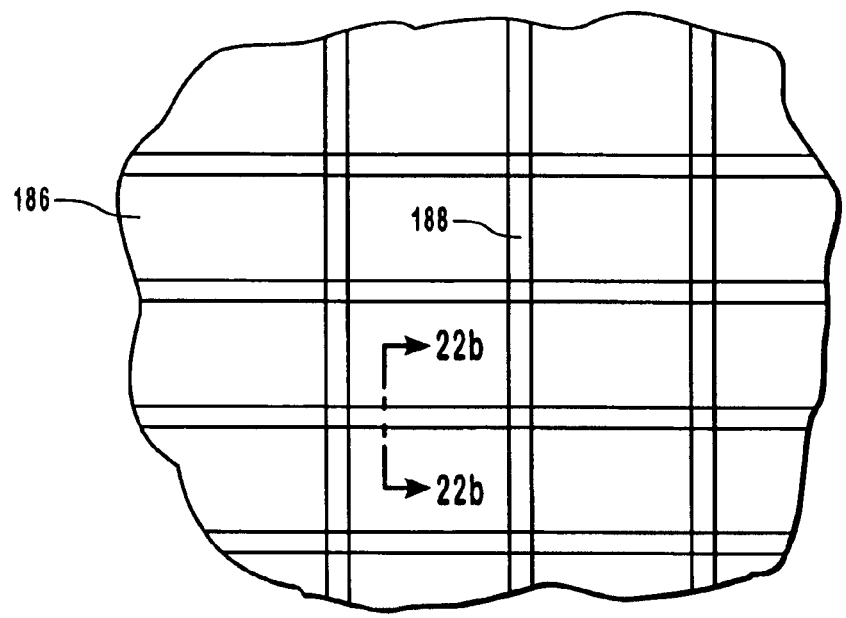
FIG. 22a is a top view of a portion of a wafer in connection with one step in the fabrication of a slider body of a recording head, in accordance with one embodiment.
Figure 22B:
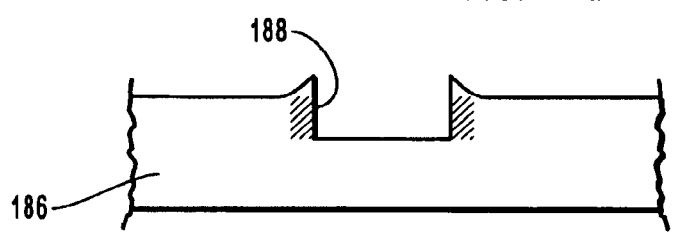
FIG. 22b is a side view of a portion of a wafer in connection with another step in the fabrication of the slider body of a recording head, in accordance with one embodiment.
Figure 22C:
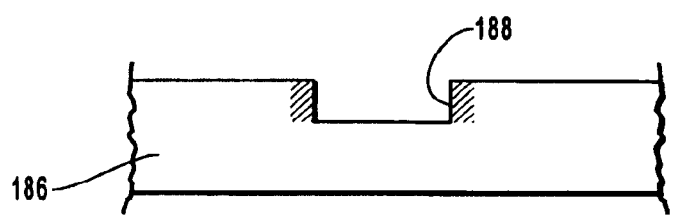
FIG. 22c is a side view of a portion of a wafer in connection with yet another step in the fabrication of the slider body of a recording head, in accordance with one embodiment.
Figure 22D:
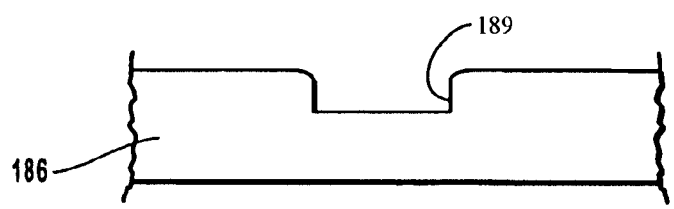
FIG. 22d is a side view of a portion of a wafer in connection with yet another step in the fabrication of air bearing surfaces of the slider body of a recording head, in accordance with one embodiment.

In another embodiment, a wafer containing a plurality of slider bodies 32 during manufacture of the recording head can be treated to ensure the reduction or elimination of rough edges on the slider body, which can otherwise present a damage risk to the recording head or the magnetic storage medium. A wafer 186 is first scribed with a saw along all lines of separation between the various slider bodies 32, as shown in FIG. 22*a*, thereby creating a plurality of channels, or saw lines 188. The depth of the saw lines 188 in one embodiment is approximately 5–25 μm, and a cross sectional view of the saw lines appears as seen in FIG. 22*b*. The wafer 186 can then be replanarized using chemical mechanical polishing ("CMP") or other suitable lapping process, to produce the shape of the saw lines 188 as shown in FIG. 22*c*. If the CMP or lapping process has not already produced rounded edges on the saw line edges the replanarized wafer can then be lightly etched at a shallow angle in a rotating chuck using an ion mill, to produce a smooth edge profile 189 for the saw lines 188 shown in FIG. 22*d*. Thus, a natural recession is formed along the edges of the saw lines 188, thereby reducing the opportunity for any rough contact points on the slider body 32 when it is operated proximate the magnetic medium surface 52. The saw lines 188 can also be used as reference points during a final cleaving process wherein the slider bodies 32 are separated. Following this step, the air bearing feature etching described in connection with FIGS. 21*a* and 21*b* can be performed on the discrete slider bodies 32.

In one embodiment, a diamond-like carbon ("DLC") layer can be applied to one or more surfaces of the slider body 32, especially in those cases where the slider body is composed of silicon. Such a DLC layer can be utilized to improve the ability of the slider body 32 to withstand surface stresses and to enhance the fracture toughness of the underlying silicon material by reducing sensitivities to microfractures in the slider body material. The DLC layer, in a compressively stressed state, can also ensure an appropriate contoured shape of the slider surface 32, if desired.

5. Manufacturing and Alignment Processes

Figure 23A:
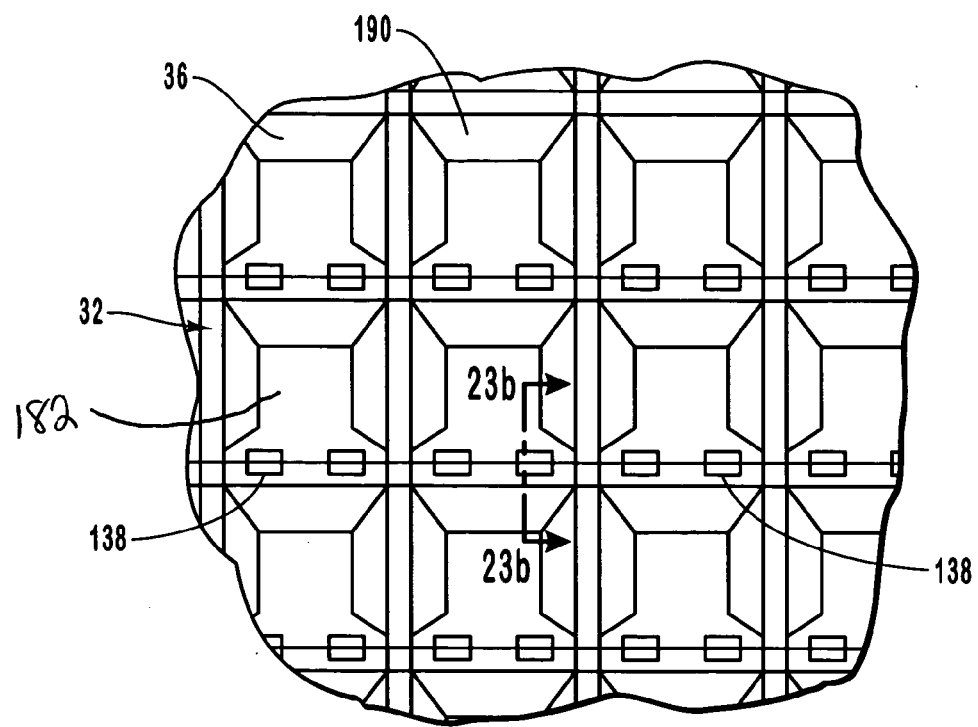
FIG. 23a is a top view of a portion of a wafer in connection with one step in the fabrication of air bearing surfaces and magnetic structures on a slider body of a recording head, in accordance with one embodiment.
Figure 23B:
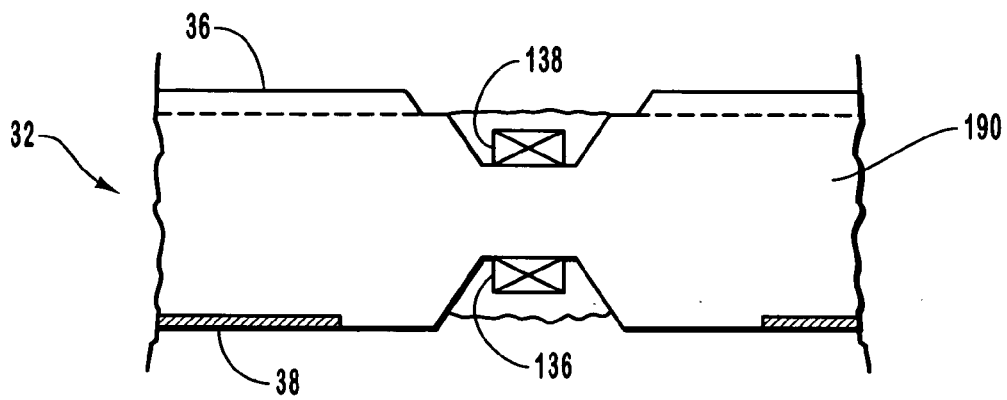
FIG. 23b is a side view of a portion of a wafer in connection with one step in the fabrication of air bearing surfaces and magnetic structures on the slider body of a recording head, in accordance with one embodiment.

Together with FIGS. 5*a*–5*f*, reference is now made to FIGS. 23*a* and 23*b*. A recording head, such as the recording head 30 shown in FIGS. 4*a* and 4*b*, can be manufactured according to one embodiment as described here. Generally, a slider body wafer 190, from which a plurality of slider bodies 32 (FIG. 4*b*) are to be formed, is produced having the necessary integrated circuitry on one side thereof. The wafer 190 is then patterned on the opposite side from the integrated circuitry. Air bearing features 182, and magnetic closure bars 136 and 138 are formed on the slider body wafer 190, as shown in FIGS. 23*a* and 23*b*. The slider body wafer 190 is then sliced into row bars (not shown), each row bar containing a plurality of connected slider bodies 32, and the row bars are end lapped to improve the surface quality.

Transducer bodies 42 are prepared by first optically grinding them while attached to the sacrificial wafer 170 (FIG. 20*a*), to a near-final stripe height (FIG. 20*b*). Each transducer body can then be subjected to a two pass, precision notching step where material is removed from the front and back side of the transducer body portion proximate the transducer 43, as was shown in FIGS. 20*c* and 20*d*. A row bar of transducer bodies 32 (not shown) is then sliced from the sacrificial wafer and placed on a tape system. The row bars are then gang diced and stretched, and are then ready for placement on the interleaver assembly 100.

An interleaver assembly wafer (not shown) is formed by first building up the flexure assemblies 106A and B (FIG. 5*a*), including the silicon oxidation polysilicon depositions (with appropriate doping), and patterning as described in connection with FIGS. 10*a*–10*d* in order to produce the desired flexure beam configurations. Electrical vias 112, such as laser vias, are formed through the body portion 108 and conductively plated. Magnetic flux sources 132 are then built up on the body portion 108, and interconnected to electrical interconnects 110 that are used to make electrical connections to the slider body 32, as shown in FIG. 5*a*. The interleaver assembly wafer is then flipped and back-ground to a reduced thickness. Bond pads 114 and alignment features can then be applied for enabling connection with the transducer body 42. The flexure beams 117 of the flexure assemblies 106 are then released. The transducer body 42 can then be attached to each interleaver assembly 100 on the wafer using optical alignment or other suitable techniques, and adhesive or metal bonding. The wafer is then scribed and stretched on tape to separate the devices.

The interleaver assembly 100 and transducer body 42 are then attached to a respective slider body 32, either individually or by row bar, using the precision assembly and alignment techniques described in connection with FIGS. 15–18*c*. Finally, if in row bar form, the row-bars are exposed to ta dry, carbon-based lapping process to lap the transducer bodies as detailed in the '920 application, are immediately DLC coated to protect the transducers, and are then cleaved to separate the final devices.

Figure 24A:
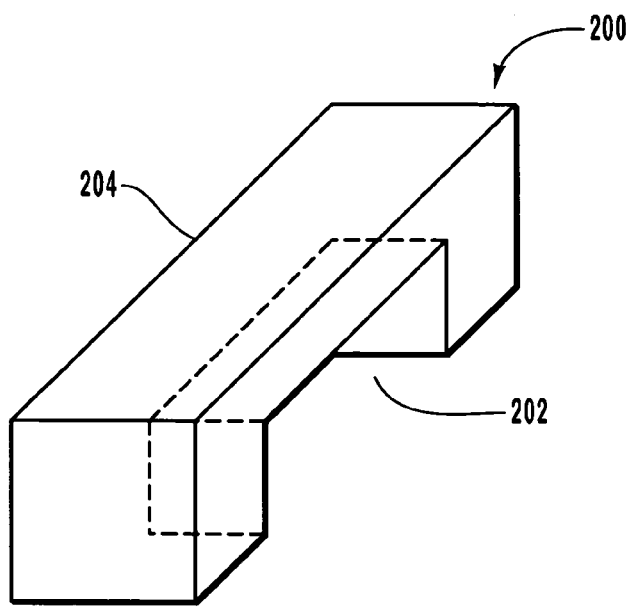
FIG. 24a is a perspective view of portions of an interleaver assembly made in accordance with one embodiment.
Figure 24B:
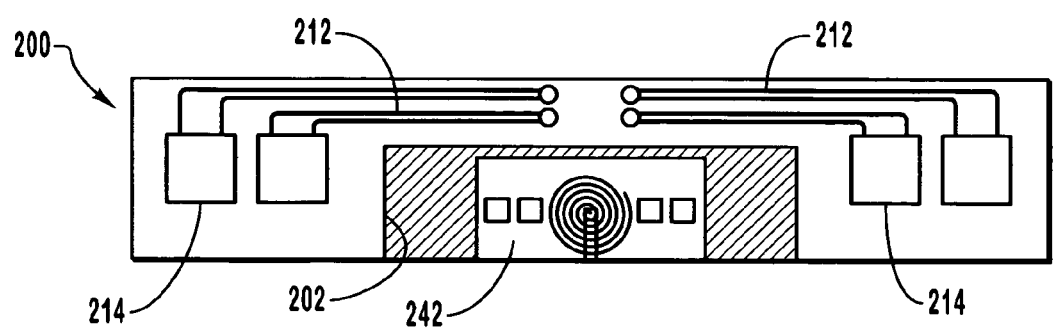
FIG. 24b is a side view of the interleaver assembly of FIG. 24a, including a transducer positioned therein and various other details.

Reference is now made to FIGS. 24*a* and 24*b*, which depict various details regarding an interleaver assembly, generally depicted at 200, according to one embodiment. The interleaver assembly 200 can be used in applications where reduced interleaver mass, minimization of wire band length between the interleaver body and the transducer, and reduction of the moment arm extending from the slider body to the transducer are desired. In detail, the interleaver assembly 200 includes a flexure assembly 204 similar to those described above. A pocket 202 is formed in the interleaver assembly 200 by deep reactive ion etching or other suitable process, and a transducer body 242 is positioned therein, and attached with adhesives of other suitable materials. The dimensions of the pocket 202 need only be sufficient to at least partially accommodate the transducer body 242.

The depth of the pocket 202 is at least slightly less than the thickness of the transducer body 242 to aid in placement and wire bonding. In one embodiment, the interleaver is composed of silicon.

6. Active Performance Screening During Processing

As mentioned above, the transducer bodies can be desirably shaped using a dry, lubricated carbon lapping process, as detailed in the '920 application. This process can enable the dimensions of the read head and write head of the transducer to be determined during the lapping process by energizing the transducer and successively reading and writing tracks. This can also help ensure the transducer is properly operational before final assembly, which reduces scrap and waste.

In addition, this process allows for the read and write performance characteristics of the transducer to be determined during the lapping process. Examples of performance characteristics include signal amplitude, signal to noise ratio, side writing characteristics, etc. This further allows for active compensation for transducer performance.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A recording head for use in a magnetic storage device having a rotating magnetic medium, comprising:
    a slider body;
    a transducer body containing a transducer; and
    an interleaver assembly that interconnects the slider body with the transducer body, including:
        at least one interconnect region;
        a body portion; and
        at least one flexure assembly connected between the at least one interconnect region and the body portion, wherein deformation of the at least one flexure assembly in response to a motional force causes movement of the transducer with respect to a surface of the magnetic medium.

2. recording head as defined in claim 1, wherein movement of the transducer includes movement in at least one of a vertical and a horizontal direction with respect to the surface of the magnetic medium.

3. A recording head as defined in claim 1, wherein the at least one flexure assembly interconnects the interconnect region with the body portion.

4. A recording head as defined in claim 1, wherein the body portion is independently moveable with respect to the interconnect region via the at least one flexure assembly.

5. A recording head as defined in claim 1, wherein the body portion of the interleaver assembly includes a pocket, the pocket receiving at least a portion of the transducer body.

6. A recording head as defined in claim 1, wherein the transducer body attaches to the body portion of the interleaver assembly.

7. A recording head as defined in claim 1, wherein the at least one interconnect region is attached to the slider body.

8. A recording head as defined in claim 1, wherein the at least one flexure assembly includes a plurality of resilient flexure beams.

9. A recording head as defined in claim 8, wherein the flexure beams are oriented to induce transducer motion in at least one of a vertical and a horizontal direction with respect to a surface of the magnetic medium when the at least one flexure assembly is deformed.

10. A recording head as defined in claim 8, wherein each flexure beam has an L-shaped cross sectional shape.

11. A recording head as defined in claim 8, wherein each flexure beam has a linear cross sectional shape.

12. A recording head as defined in claim 8, wherein each of the beams is oriented in the at least one flexure assembly to deform along a weak axis of the flexure beam in response to the motional force.

13. A recording head as defined in claim 8, wherein at least some of the flexure beams are electrically conductive.

14. A recording head as defined in claim 13, wherein the electrically conductive flexure beams communicate with the electrical interconnects.

15. A recording head as defined in claim 13, wherein the electrically conductive flexure beams are composed of at least one of polysilicon and single crystal silicon.

16. A recording head as defined in claim 1, wherein a plurality of electrical interconnects are employed to provide electrical communication between the slider body and the interleaver assembly.

17. A recording head as defined in claim 1, wherein vias are defined through the body portion to provide electrical communication between the interleaver assembly and the transducer body.

18. A recording head as defined in claim 1, wherein two flexure assemblies are included in the interleaver assembly.

19. A recording head as defined in claim 1, further comprising a motor assembly for imparting the motional force on the at least one flexure assembly.

20. A recording head as defined in claim 1, wherein a surface of the transducer body that is proximate the surface of the magnetic medium is shaped to form an air bearing surface.

21. A recording head as defined in claim 20, wherein the air bearing surface forms a step formation about the transducer.

22. A recording head as defined in claim 20, wherein the air bearing surface is angled about the transducer.

23. A recording head as defined in claim 1, wherein the transducer body is formed using a sacrificial wafer.

24. A recording head for use in a magnetic storage device having a rotating magnetic medium, comprising:
    a slider body;
    a transducer body containing a transducer and;
    an interleaver assembly including:
        first and second interconnect regions, the first and second interconnect regions connected to the slider body;
        a body portion having a central portion extending between the first and second interconnect regions, the body portion being connected to the transducer body;
        a first flexure assembly connecting the first interconnect region with the central portion; and
        a second flexure assembly connecting the second interconnect region with the central portion, wherein movement of at least one of the first and second flexure assemblies in response to a motional force closes a gap defined between the central portion of the body portion and the slider body, and wherein selective movement of at least one of the first and second flexure assemblies causes corresponding movement of the transducer with respect to a surface of the magnetic medium.

25. A recording head as defined in claim 24, wherein the first flexure assembly is interposed between the first interconnect region and the central portion, and wherein the second flexure assembly is interposed between the second interconnect region and the central portion.

26. A recording head as defined in claim 24, further comprising a motor assembly for imparting the motional force on at least one of the first and second flexure assemblies.

27. A recording head as defined in claim 26, wherein the motor assembly includes first and second motor assemblies.

28. A recording head as defined in claim 27, wherein each of the first and second motor assemblies includes:
- at least one magnetic flux source located on at least one of the first and second interconnect regions;
- an inner closure bar located in the central portion of the body portion; and
- top and bottom magnetic closure loops located in the slider body proximate the magnetic flux source and the inner closure loop such that a magnetic closure loop is formed.

29. A recording head as defined in claim 28, wherein the ends of at the least one magnetic flux source are offset in a vertical direction with respect to the top and bottom closure bars to induce a downward force between the magnetic flux source and the top and bottom closure bars when the magnetic flux source is energized.

30. A recording head as defined in claim 27, wherein first and second motor subassemblies operate independently with respect to one another.

31. A recording head as defined in claim 26, wherein the motor assembly includes:
- first and second magnetic flux sources located in the central portion of the body portion;
- first and second magnetic closure bars positioned in the slider body; and
- a vertical magnetic closure bar positioned in the central portion.

* * * * *

UNITED STATES PATENT AND TRADEMARK OFFICE
CERTIFICATE OF CORRECTION

PATENT NO. : 7,248,442 B1  Page 1 of 1
APPLICATION NO. : 10/794482
DATED : July 24, 2007
INVENTOR(S) : Meyer It is certified that error appears in the above-identified patent and that said Letters Patent is hereby corrected as shown below:

Column 10
Line 55, after "body portion" insert --108--
Line 56, after "body" insert --32--

Column 11
Line 20, change "FY" to --$F_y$--

Column 13
Line 10, change "FIG. 1a" to --FIG. 11a--
Line 20, change "FIG. 1b" to --FIG. 11b--

Column 16
Line 31, change "pervious" to --previous--
Line 41, change "43" to --42--

Column 18
Line 39, change "ta" to --a--

Signed and Sealed this

Twenty-fourth Day of June, 2008

JON W. DUDAS
*Director of the United States Patent and Trademark Office*